(12) United States Patent
Chen et al.

(10) Patent No.: US 10,257,667 B2
(45) Date of Patent: Apr. 9, 2019

(54) DATA TRANSMISSION METHOD AND DEVICE

(71) Applicant: Huawei Technologies Co., Ltd., Shenzhen (CN)

(72) Inventors: Ji Chen, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/551,861

(22) PCT Filed: Feb. 17, 2015

(86) PCT No.: PCT/CN2015/073232
§ 371 (c)(1),
(2) Date: Aug. 17, 2017

(87) PCT Pub. No.: WO2016/131195
PCT Pub. Date: Aug. 25, 2016

(65) Prior Publication Data
US 2018/0014164 A1    Jan. 11, 2018

(51) Int. Cl.
*H04W 4/08* (2009.01)
*H04W 8/18* (2009.01)
(Continued)

(52) U.S. Cl.
CPC ............ *H04W 4/08* (2013.01); *H04L 12/189* (2013.01); *H04W 8/18* (2013.01); *H04W 48/10* (2013.01);
(Continued)

(58) Field of Classification Search
CPC ....... H04W 4/08; H04W 48/16; H04W 48/10; H04W 8/18; H04W 84/18; H04W 84/12; H04L 12/189
See application file for complete search history.

(56) References Cited

U.S. PATENT DOCUMENTS

2008/0062948 A1   3/2008  Ponnuswamy
2008/0186913 A1*  8/2008  Ahn ...................... H04L 12/185
                                                                370/329
(Continued)

FOREIGN PATENT DOCUMENTS

CN    102821466 A    12/2012
CN    102892105 A     1/2013
(Continued)

OTHER PUBLICATIONS

Foreign Communication From a Counterpart Application, European Application No. 15882334.4, Partial Supplementary European Search Report dated Oct. 27, 2017, 14 pages.
(Continued)

*Primary Examiner* — Dady Chery
(74) *Attorney, Agent, or Firm* — Conley Rose, P.C.

(57) ABSTRACT

A data transmission method and device, where the method includes determining, by a first station device, that a second station device supports a first service, receiving a device group join request message that is sent by the second station device according to a media access control (MAC) address of a first device group, where the first device group is a device group of the first service and is a device group to which the first station device belongs, sending a device group join response message to another station device in the first device group and the second station device according to the multicast MAC address of the first device group in a contention transmission manner, and performing data transmission of the first service with the second station device in a service window of the first service, where the service window includes a time and/or a channel of service transmission.

18 Claims, 7 Drawing Sheets

(51) Int. Cl.
    *H04W 84/18*   (2009.01)
    *H04L 12/18*   (2006.01)
    *H04W 48/10*   (2009.01)
    *H04W 48/16*   (2009.01)
    *H04W 84/12*   (2009.01)

(52) U.S. Cl.
    CPC ........... *H04W 48/16* (2013.01); *H04W 84/18* (2013.01); *H04W 84/12* (2013.01)

(56) References Cited

U.S. PATENT DOCUMENTS

| | | | |
|---|---|---|---|
| 2011/0075599 A1* | 3/2011 | Liao | H04L 12/185 370/312 |
| 2014/0086069 A1 | 3/2014 | Frey et al. | |
| 2014/0112189 A1 | 4/2014 | Abraham et al. | |

FOREIGN PATENT DOCUMENTS

| | | |
|---|---|---|
| CN | 103889021 A | 6/2014 |
| CN | 104333888 A | 2/2015 |
| EP | 2487963 A2 | 8/2012 |
| WO | 2014186593 A1 | 11/2014 |

OTHER PUBLICATIONS

Machine Translation and Abstract of Chinese Publication No. CN102821466, Dec. 12, 2012, 43 pages.
Machine Translation and Abstract of Chinese Publication No. CN102892105, Jan. 23, 2013, 29 pages.
Machine Translation and Abstract of Chinese Publication No. CN103889021, Jun. 25, 2014, 16 pages.
Machine Translation and Abstract of Chinese Publication No. CN104333888, Feb. 4, 2015, 20 pages.
"Wi-Fi Neighbor Awareness Networking (NAN) Technical Specification," Version 1.0, WiFi Alliance, May 2015, 98 pages.
"Part 11:Wireless LAN Medium Access Control (MAC) and Physical Layer(PHY) Specifications," Part 1, IEEE Std 802.11-2012, IEEE Computer Society, Mar. 29, 2012, 1396 pages.
"Part 11:Wireless LAN Medium Access Control (MAC) and Physical Layer(PHY) Specifications," Part 2, IEEE Std 802.11-2012, IEEE Computer Society, Mar. 29, 2012, 1397 pages.
Foreign Communication From a Counterpart Application, PCT Application No. PCT/CN2015/073232, English Translation of International Search Report dated Nov. 27, 2015, 2 pages.
Foreign Communication From a Counterpart Application, PCT Application No. PCT/CN2015/073232, English Translation of Written Opinion dated Nov. 27, 2015, 7 pages.

\* cited by examiner

DATA TRANSMISSION METHOD AND DEVICE

CROSS-REFERENCE TO RELATED APPLICATION

This application is a U.S. National Stage of International Patent Application No. PCT/CN2015/073232 filed on Feb. 17, 2015, which is hereby incorporated by reference in its entirety.

TECHNICAL FIELD

Embodiments of the present disclosure relate to the field of communications technologies, and in particular, to a data transmission method and device.

BACKGROUND

A WI-FI technology is a short-range wireless communications technology. A central node generally exists in the WI-FI technology, and is also referred to as an access point (AP), other nodes are also referred to as stations and are connected to the AP, and then data transmission between stations is implemented by means of the AP.

However, when no AP node exists, a Neighbor Awareness Networking (NAN) standard is stipulated in other approaches such that a station may discover a service of another station if there is no AP. Further, the NAN standard is fixed on the channel 6, a discovery window (DW) exists in every 512 milliseconds (ms), the DW lasts for a time length of 16 ms, and in the DW, stations are in a wakeup state and perform service discovery. Because only a service discovery process is specified in the NAN standard, after the stations complete service discovery, the stations access another network other than an NAN network, and data transmission between the stations is implemented by means of the other network. Further, after the stations complete service discovery, the stations may correspondingly establish, based on information obtained in service discovery, a data transmission network based on a wireless local area network WLAN or a peer-to-peer (P2P) network, and then data transmission between the stations is implemented by means of the established data transmission network.

However, in the other approaches, after service discovery is implemented, another data transmission network needs to be further established to implement data transmission between the stations. Consequently, data cannot be transmitted in time, thereby reducing transmission efficiency.

SUMMARY

Embodiments of the present disclosure provide a data transmission method and device such that service data can be transmitted in time, thereby improving transmission efficiency.

According to a first aspect, an embodiment of the present disclosure provides a data transmission method, including determining, by a first station device, that a second station device supports a first service, receiving, by the first station device, a device group join request message that is sent by the second station device according to a multicast Media Access Control (MAC) address of a first device group, where the device group join request message is used to request to join the first device group, the first device group includes the first station device, and each station device in the first device group supports the first service, sending, by the first station device, a device group join response message to another station device in the first device group and the second station device according to the multicast MAC address of the first device group in a contention transmission manner, where the device group join response message is used to allow the second station device to join the first device group, and performing, by the first station device, data transmission of the first service with the second station device in a service window of the first service, where the service window includes a time and/or a channel of service transmission.

In a first possible implementation manner of the first aspect, sending, by the first station device, a device group join response message to another station device in the first device group and the second station device according to the multicast MAC address of the first device group in a contention transmission manner includes sending, by the first station device, a device group join response message to the other station device in the first device group and the second station device according to the multicast MAC address of the first device group after the contention backoff process ends when the first station device does not receive, in a contention backoff process, the device group join response message sent by the other station device in the first device group.

With reference to the first aspect or the first possible implementation manner of the first aspect, in a second possible implementation manner of the first aspect, after sending, by the first station device, a device group join response message to another station device in the first device group and the second station device according to the multicast MAC address of the first device group in a contention transmission manner, the method further includes receiving, by the first station device, a device identifier notification message sent by the second station device, where the device identifier notification message includes a first device identifier, and the first device identifier is a device identifier of the second station device in the first device group.

With reference to the first aspect, the first possible implementation manner of the first aspect or the second possible implementation manner of the first aspect, in a third possible implementation manner of the first aspect, the device group join response message includes an Internet Protocol (IP) address prefix of the first device group.

With reference to the first aspect or any one of the first to third possible implementation manners of the first aspect, in a fourth possible implementation manner of the first aspect, determining, by a first station device, that a second station device supports a first service includes sending, by the first station, a service announcement message by means of broadcast, where the service announcement message includes identifier information of the first service, and receiving, by the first station device, a service response message sent by the second station device, where the service announcement message includes at least one of the multicast MAC address of the first device group, identifier information of the first device group, or the IP address prefix of the first device group.

According to a second aspect, an embodiment of the present disclosure provides a data transmission method, including determining, by a second station device, that a first station device supports a first service, where the second station device supports the first service, sending, by the second station device, a device group join request message to a first device group according to a multicast MAC address of the first device group, where the device group join request message is used to request to join the first device group, the first device group includes the first station device, and each station device in the first device group supports the first service, receiving, by the second station device, a device group join response message that is sent by a station device in the first device group according to the multicast MAC address of the first device group in a contention transmission manner, where the device group join response message is used to allow the second station device to join the first device group, and performing, by the second station device, data transmission of the first service with a station device in the first device group in a service window of the first service, where the service window includes a time and/or a channel of service transmission.

In a first possible implementation manner of the second aspect, after receiving, by the second station device, a device group join response message that is sent by a station device in the first device group according to the multicast MAC address of the first device group in a contention transmission manner, the method further includes generating, by the second station device, a first device identifier according to a first IP address, where the first IP address is an IP address of the second station device, and the first device identifier is an identifier of the second station device in the first device group.

With reference to the first possible implementation manner of the second aspect, in a second possible implementation manner of the second aspect, before generating, by the second station device, a first device identifier according to a first IP address, the method further includes performing, by the second station device, a Hash operation on a MAC address of the second station device, to generate a host address of the second station device, and generating, by the second station device, the first IP address according to an IP address prefix of the first device group and the host address of the second station device.

With reference to the second possible implementation manner of the second aspect, in a third possible implementation manner of the second aspect, the device group join response message includes the IP address prefix of the first device group.

With reference to any one of the first to third possible implementation manners of the second aspect, in a fourth possible implementation manner of the second aspect, generating, by the second station device, a first device identifier according to a first IP address includes generating, by the second station device, the first device identifier according to the host address of the second station device in the first IP address, or performing, by the second station device, a Hash operation on the first IP address to generate the first device identifier.

With reference to any one of the first to fourth possible implementation manners of the second aspect, in a fifth possible implementation manner of the second aspect, after generating, by the second station device, a first device identifier according to a first IP address, the method further includes sending, by the second station device, a device identifier notification message to the first device group according to the multicast MAC address of the first device group, where the device identifier notification message includes the first device identifier.

With reference to the second aspect or any one of the first to fifth possible implementation manners of the second aspect, in a sixth possible implementation manner of the second aspect, determining, by a second station device, that a first station device supports a first service includes receiving, by the second station device, a service announcement message that is sent by the first station device by means of broadcast, where the service announcement message includes identifier information of the first service, and the service announcement message includes information about the service window of the first service, and sending, by the second station device, a service response message to the first station device, where the service announcement message includes at least one of the multicast MAC address of the first device group, identifier information of the first device group, or the IP address prefix of the first device group.

According to a third aspect, an embodiment of the present disclosure provides a data transmission method, including determining, by a first station device, that a second station device supports a first service, receiving, by the first station device, a device identifier notification message that is sent by the second station device according to a multicast MAC address of a first device group, where the device identifier notification message includes a first device identifier, the first device identifier is a device identifier of the second station device in the first device group, the first device group includes the first station device, and each station device in the first device group supports the first service, and performing, by the first station device, data transmission of the first service with the second station device in a service window of the first service, where the service window includes a time and/or a channel of service transmission.

In a first possible implementation manner of the third aspect, determining, by a first station device, that a second station device supports a first service includes sending, by the first station, a service announcement message by means of broadcast, where the service announcement message includes identifier information of the first service, and receiving, by the first station device, a service response message sent by the second station device, where the service announcement message includes at least one of the multicast MAC address of the first device group, identifier information of the first device group, or an IP address prefix of the first device group.

According to a fourth aspect, an embodiment of the present disclosure provides a data transmission method, including determining, by a second station device, that a first station device supports a first service, where the second station device supports the first service, generating, by the second station device, a first device identifier according to a first IP address, where the first IP address is an IP address of the second station device, the first device identifier is an identifier of the second station device in a first device group, the first device group includes the first station device, and each station device in the first device group supports the first service, and performing, by the second station device, data transmission of the first service with a station device in the first device group in a service window of the first service, where the service window includes a time and/or a channel of service transmission.

In a first possible implementation manner of the fourth aspect, before generating, by the second station device, a first device identifier according to a first IP address, the method further includes performing, by the second station device, a Hash operation on a MAC address of the second station device to generate a host address of the second station device, and generating, by the second station device, the first IP address according to an IP address prefix of the first device group and the host address of the second station device.

With reference to the fourth aspect or the first possible implementation manner of the fourth aspect, in a second possible implementation manner of the fourth aspect, generating, by the second station device, a first device identifier according to a first IP address includes generating, by the second station device, the first device identifier according to the host address of the second station device in the first IP address, or performing, by the second station device, a Hash operation on the first IP address to generate the first device identifier.

With reference to the fourth aspect, the first possible implementation manner of the fourth aspect or the second possible implementation manner of the fourth aspect, in a third possible implementation manner of the fourth aspect, after generating, by the second station device, a first device identifier according to a first IP address, the method further includes sending, by the second station device, a device identifier notification message to the first device group according to a multicast MAC address of the first device group, where the device identifier notification message includes the first device identifier.

With reference to the fourth aspect or any one of the first to third possible implementation manners of the fourth aspect, in a fourth possible implementation manner of the fourth aspect, determining, by a second station device, that a first station device supports a first service includes receiving, by the second station device, a service announcement message that is sent by the first station device by means of broadcast, where the service announcement message includes identifier information of the first service, and sending, by the second station device, a service response message to the first station device, where the service announcement message includes at least one of the multicast MAC address of the first device group, identifier information of the first device group, or the IP address prefix of the first device group.

According to a fifth aspect, an embodiment of the present disclosure provides a station device, including a processing unit configured to determine that a second station device supports a first service, and a transceiver unit configured to receive a device group join request message that is sent by the second station device according to a multicast MAC address of a first device group, where the device group join request message is used to request to join the first device group, the first device group includes the station device in which the transceiver unit is located, and each station device in the first device group supports the first service, send a device group join response message to another station device in the first device group and the second station device according to the multicast MAC address of the first device group in a contention transmission manner, where the device group join response message is used to allow the second station device to join the first device group, and perform data transmission of the first service with the second station device in a service window of the first service, where the service window includes a time and/or a channel of service transmission.

In a first possible implementation manner of the fifth aspect, sending a device group join response message to another station device in the first device group and the second station device according to the multicast MAC address of the first device group in a contention transmission manner includes sending a device group join response message to the other station device in the first device group and the second station device according to the multicast MAC address of the first device group after the contention backoff process ends when the device group join response message sent by the other station device in the first device group is not received in a contention backoff process.

With reference to the fifth aspect or the first possible implementation manner of the fifth aspect, in a second possible implementation manner of the fifth aspect, after the device group join response message is sent to the other station device in the first device group and the second station device according to the multicast MAC address of the first device group in the contention transmission manner, the transceiver unit is further configured to receive a device identifier notification message sent by the second station device, where the device identifier notification message includes a first device identifier, and the first device identifier is a device identifier of the second station device in the first device group.

With reference to the fifth aspect, the first possible implementation manner of the fifth aspect or the second possible implementation manner of the fifth aspect, in a third possible implementation manner of the fifth aspect, the device group join response message includes an IP address prefix of the first device group.

With reference to the fifth aspect or any one of the first to third possible implementation manners of the fifth aspect, in a fourth possible implementation manner of the fifth aspect, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or the IP address prefix of the first device group.

According to a sixth aspect, an embodiment of the present disclosure provides a station device, including a processing unit configured to determine that a first station device supports a first service, where the station device in which the processing unit is located supports the first service, and a transceiver unit configured to send a device group join request message to a first device group according to a multicast MAC address of the first device group, where the device group join request message is used to request to join the first device group, the first device group includes the first station device, and each station device in the first device group supports the first service, receive a device group join response message that is sent by a station device in the first device group according to the multicast MAC address of the first device group in a contention transmission manner, where the device group join response message is used to allow the station device in which the transceiver unit is located to join the first device group, and perform data transmission of the first service with a station device in the first device group in a service window of the first service, where the service window includes a time and/or a channel of service transmission.

In a first possible implementation manner of the sixth aspect, after the transceiver unit receives the device group join response message that is sent by the station device in the first device group according to the multicast MAC address of the first device group in the contention transmission manner, the processing unit is further configured to generate a first device identifier according to a first IP address, where the first IP address is an IP address of the station device in which the processing unit is located, and the first device identifier is an identifier of the station device in which the processing unit is located when the station device is in the first device group.

With reference to the first possible implementation manner of the sixth aspect, in a second possible implementation manner of the sixth aspect, before the first device identifier is generated according to the first IP address, the processing unit is further configured to perform a Hash operation on a MAC address of the station device in which the processing unit is located, to generate a host address of the station device in which the processing unit is located, and generate the first IP address according to an IP address prefix of the first device group and the host address of the station device in which the processing unit is located.

With reference to the second possible implementation manner of the sixth aspect, in a third possible implementation manner of the sixth aspect, the device group join response message includes the IP address prefix of the first device group.

With reference to any one of the first to third possible implementation manners of the sixth aspect, in a fourth possible implementation manner of the sixth aspect, generating a first device identifier according to a first IP address includes generating the first device identifier according to the host address, in the first IP address, of the station device in which the processing unit is located, or performing a Hash operation on the first IP address to generate the first device identifier.

With reference to any one of the first to fourth possible implementation manners of the sixth aspect, in a fifth possible implementation manner of the sixth aspect, after the processing unit generates the first device identifier according to the first IP address, the transceiver unit is further configured to send a device identifier notification message to the first device group according to the multicast MAC address of the first device group, where the device identifier notification message includes the first device identifier.

With reference to any one of the first to fifth possible implementation manners of the sixth aspect, in a sixth possible implementation manner of the sixth aspect, determining that a first station device supports a first service includes receiving a service announcement message that is sent by the first station device by means of broadcast, where the service announcement message includes identifier information of the first service, and the service announcement message includes information about the service window of the first service, and sending a service response message to the first station device, where the service announcement message includes at least one of the multicast MAC address of the first device group, identifier information of the first device group, or the IP address prefix of the first device group.

According to a seventh aspect, an embodiment of the present disclosure provides a station device, including a processing unit configured to determine that a second station device supports a first service, and a transceiver unit configured to receive a device identifier notification message that is sent by the second station device according to a multicast MAC address of a first device group, where the device identifier notification message includes a first device identifier, the first device identifier is a device identifier of the second station device in the first device group, the first device group includes the station device in which the transceiver unit is located, and each station device in the first device group supports the first service, and perform data transmission of the first service with the second station device in a service window of the first service, where the service window includes a time and/or a channel of service transmission.

In a first possible implementation manner of the seventh aspect, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or an IP address prefix of the first device group.

According to an eighth aspect, an embodiment of the present disclosure provides a station device, including a processing unit configured to determine that a first station device supports a first service, where the station device in which the processing unit is located supports the first service, and generate a first device identifier according to a first IP address, where the first IP address is an IP address of the station device in which the processing unit is located, the first device identifier is an identifier of the station device in which the processing unit is located when the station device is in a first device group, the device group join request message is used to request to join the first device group, the first device group includes the first station device, and each station device in the first device group supports the first service, and a transceiver unit configured to perform data transmission of the first service with a station device in the first device group in a service window of the first service, where the service window includes a time and/or a channel of service transmission.

In a first possible implementation manner of the eighth aspect, before the first device identifier is generated according to the first IP address, the processing unit is further configured to perform a Hash operation on a MAC address of the station device in which the processing unit is located to generate a host address of the station device in which the processing unit is located, and generate the first IP address according to an IP address prefix of the first device group and the host address of the station device in which the processing unit is located.

With reference to the eighth aspect or the first possible implementation manner of the eighth aspect, in a second possible implementation manner of the eighth aspect, generating a first device identifier according to a first IP address further includes generating the first device identifier according to the host address, in the first IP address, of the station device in which the processing unit is located, or performing a Hash operation on the first IP address, to generate the first device identifier.

With reference to the eighth aspect, the first possible implementation manner of the eighth aspect or the second possible implementation manner of the eighth aspect, in a third possible implementation manner of the eighth aspect, after the processing unit generates the first device identifier according to the first IP address, the transceiver unit is further configured to send a device identifier notification message to the first device group according to the multicast MAC address of the first device group, where the device identifier notification message includes the first device identifier.

With reference to the eighth aspect or any one of the first to third possible implementation manners of the eighth aspect, in a fourth possible implementation manner of the eighth aspect, determining that a first station device supports a first service further includes receiving a service announcement message that is sent by the first station device by means of broadcast, where the service announcement message includes identifier information of the first service, and sending a service response message to the first station device, where the service announcement message includes at least one of the multicast MAC address of the first device group, identifier information of the first device group, or the IP address prefix of the first device group.

According to a ninth aspect, an embodiment of the present disclosure provides a station device, including a processor configured to determine that a second station device supports a first service, and a transceiver configured to receive a device group join request message that is sent by the second station device according to a multicast MAC address of a first device group, where the device group join request message is used to request to join the first device group, the first device group includes the station device in which the transceiver is located, and each station device in the first device group supports the first service, send a device group join response message to another station device in the first device group and the second station device according to the multicast MAC address of the first device group in a contention transmission manner, where the device group join response message is used to allow the second station device to join the first device group, and perform data transmission of the first service with the second station device in a service window of the first service, where the service window includes a time and/or a channel of service transmission.

In a first possible implementation manner of the ninth aspect, sending a device group join response message to another station device in the first device group and the second station device according to the multicast MAC address of the first device group in a contention transmission manner includes sending a device group join response message to the other station device in the first device group and the second station device according to the multicast MAC address of the first device group after the contention backoff process ends when the device group join response message sent by the other station device in the first device group is not received in a contention backoff process.

With reference to the ninth aspect or the first possible implementation manner of the ninth aspect, in a second possible implementation manner of the ninth aspect, after the device group join response message is sent to the other station device in the first device group and the second station device according to the multicast MAC address of the first device group in the contention transmission manner, the transceiver is further configured to receive a device identifier notification message sent by the second station device, where the device identifier notification message includes a first device identifier, and the first device identifier is a device identifier of the second station device in the first device group.

With reference to the ninth aspect, the first possible implementation manner of the ninth aspect or the second possible implementation manner of the ninth aspect, in a third possible implementation manner of the ninth aspect, the device group join response message includes an IP address prefix of the first device group.

With reference to the ninth aspect or any one of the first to third possible implementation manners of the ninth aspect, in a fourth possible implementation manner of the ninth aspect, determining that a second station device supports a first service further includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or the IP address prefix of the first device group.

According to a tenth aspect, an embodiment of the present disclosure provides a station device, including a processor configured to determine that a first station device supports a first service, where the station device in which the processor is located supports the first service, and a transceiver configured to send a device group join request message to a first device group according to a multicast MAC address of the first device group, where the device group join request message is used to request to join the first device group, the first device group includes the first station device, and each station device in the first device group supports the first service, receive a device group join response message that is sent by a station device in the first device group according to the multicast MAC address of the first device group in a contention transmission manner, where the device group join response message is used to allow the station device in which the transceiver is located to join the first device group, and perform data transmission of the first service with a station device in the first device group in a service window of the first service, where the service window includes a time and/or a channel of service transmission.

In a first possible implementation manner of the tenth aspect, after the transceiver receives the device group join response message that is sent by the station device in the first device group according to the multicast MAC address of the first device group in the contention transmission manner, the processor is further configured to generate a first device identifier according to a first IP address, where the first IP address is an IP address of the station device in which the processor is located, and the first device identifier is an identifier of the station device in which the processor is located when the station device is in the first device group.

With reference to the first possible implementation manner of the tenth aspect, in a second possible implementation manner of the tenth aspect, the processor is further configured to before the first device identifier is generated according to the first IP address, perform a Hash operation on a MAC address of the station device in which the processor is located to generate a host address of the station device in which the processor is located, and generate the first IP address according to an IP address prefix of the first device group and the host address of the station device in which the processor is located.

With reference to the second possible implementation manner of the tenth aspect, in a third possible implementation manner of the tenth aspect, the device group join response message includes the IP address prefix of the first device group.

With reference to any one of the first to third possible implementation manners of the tenth aspect, in a fourth possible implementation manner of the tenth aspect, generating a first device identifier according to a first IP address further includes generating the first device identifier according to the host address, in the first IP address, of the station device in which the processor is located, or performing a Hash operation on the first IP address to generate the first device identifier.

With reference to any one of the first to fourth possible implementation manners of the tenth aspect, in a fifth possible implementation manner of the tenth aspect, after the processor generates the first device identifier according to the first IP address, the transceiver is further configured to send a device identifier notification message to the first device group according to the multicast MAC address of the first device group, where the device identifier notification message includes the first device identifier.

With reference to the tenth aspect or any one of the first to fifth possible implementation manners of the tenth aspect, in a sixth possible implementation manner of the tenth aspect, determining that a first station device supports a first service further includes receiving a service announcement message that is sent by the first station device by means of broadcast, where the service announcement message includes identifier information of the first service, and the service announcement message includes information about the service window of the first service, and sending a service response message to the first station device, where the service announcement message includes at least one of the multicast MAC address of the first device group, identifier information of the first device group, or the IP address prefix of the first device group.

According to an eleventh aspect, an embodiment of the present disclosure provides a station device, including a processor configured to determine that a second station device supports a first service, and a transceiver configured to receive a device identifier notification message that is sent by the second station device according to a multicast MAC address of a first device group, where the device identifier notification message includes a first device identifier, the first device identifier is a device identifier of the second station device in the first device group, the first device group includes the station device in which the transceiver is located, and each station device in the first device group supports the first service, and perform data transmission of the first service with the second station device in a service window of the first service, where the service window includes a time and/or a channel of service transmission.

In a first possible implementation manner of the eleventh aspect, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or an IP address prefix of the first device group.

According to a twelfth aspect, an embodiment of the present disclosure provides a station device, including a processor configured to determine that a first station device supports a first service, where the station device in which the processor is located supports the first service, and generate a first device identifier according to a first IP address, where the first IP address is an IP address of the station device in which the processor is located, the first device identifier is an identifier of the station device in which the processor is located when the station device is in a first device group, the device group join request message is used to request to join the first device group, the first device group includes the first station device, and each station device in the first device group supports the first service, and a transceiver configured to perform data transmission of the first service with a station device in the first device group in a service window of the first service, where the service window includes a time and/or a channel of service transmission.

In a first possible implementation manner of the twelfth aspect, before the first device identifier is generated according to the first IP address, the processor is further configured to perform a Hash operation on a MAC address of the station device in which the processor is located to generate a host address of the station device in which the processor is located, and generate the first IP address according to an IP address prefix of the first device group and the host address of the station device in which the processor is located.

With reference to the twelfth aspect or the first possible implementation manner of the twelfth aspect, in a second possible implementation manner of the twelfth aspect, generating a first device identifier according to a first IP address includes generating the first device identifier according to the host address, in the first IP address, of the station device in which the processor is located, or performing a Hash operation on the first IP address, to generate the first device identifier.

With reference to the twelfth aspect, the first possible implementation manner of the twelfth aspect or the second possible implementation manner of the twelfth aspect, in a third possible implementation manner of the twelfth aspect, after the processor generates the first device identifier according to the first IP address, the transceiver is further configured to send a device identifier notification message to the first device group according to the multicast MAC address of the first device group, where the device identifier notification message includes the first device identifier.

With reference to the twelfth aspect or any one of the first to third possible implementation manners of the twelfth aspect, in a fourth possible implementation manner of the twelfth aspect, determining that a first station device supports a first service further includes receiving a service announcement message that is sent by the first station device by means of broadcast, where the service announcement message includes identifier information of the first service, and sending a service response message to the first station device, where the service announcement message includes at least one of the multicast MAC address of the first device group, identifier information of the first device group, or the IP address prefix of the first device group.

According to the data transmission method and device provided in the embodiments of the present disclosure, a first station device determines that a second station device supports a first service, receives a device group join request message that is sent by the second station device according to a multicast MAC address of a first device group, and then sends a device group join response message to another station device in the first device group and the second station device according to the multicast MAC address of the first device group in a contention transmission manner such that the second station device joins the first device group, and then the first station device performs data transmission of the first service with the second station device in a service window of the first service. After service discovery, a station device needing to perform data transmission of a same service is added to a same device group in the manner. Therefore, station devices belonging to the same device group perform service data transmission, no other data transmission network needs to be further established to implement service data transmission such that service data can be transmitted in time, thereby improving transmission efficiency.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
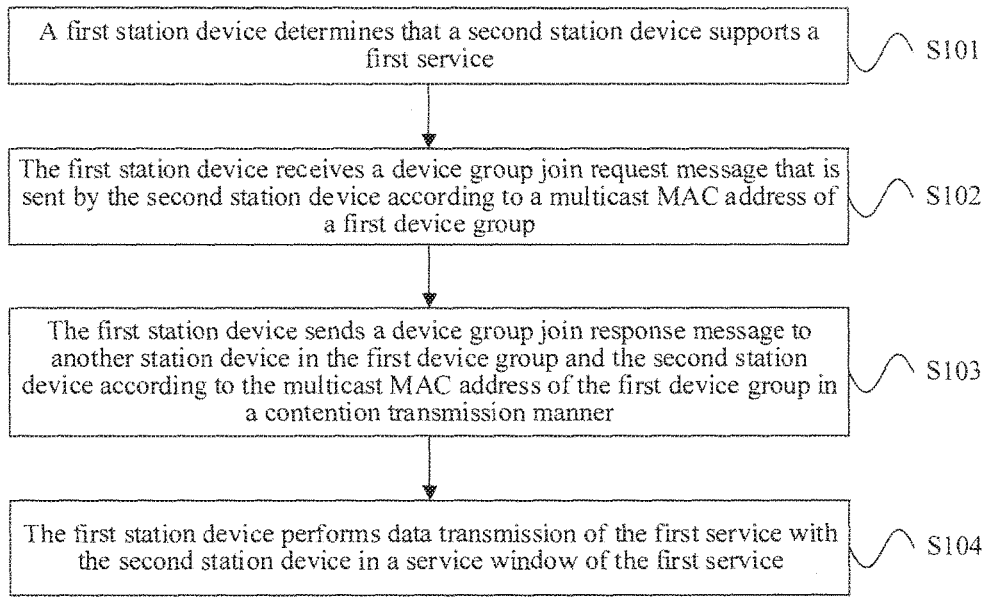
FIG. 1 is a flowchart of Embodiment 1 of a data transmission method according to the present disclosure.

FIG. 1 is a flowchart of Embodiment 1 of a data transmission method according to the present disclosure. As shown in FIG. 1, the method of this embodiment may include the following steps.

Step S101: A first station device determines that a second station device supports a first service.

In this embodiment, if the second station device supports the first service, the first station device may determine that the second station device supports the first service.

An optional implementation manner in which the first station device determines that the second station device supports the first service includes that the first station device sends a service announcement message by means of broadcast, the service announcement message includes identifier information of the first service and information about a service window of the first service, the service window includes a time and/or a channel of service transmission, and the service announcement message is used to indicate that the first station device supports the first service. Correspondingly, after the second station device receives the service announcement message that is sent by the first station device by means of broadcast, if the second station device supports the first service, the first station device receives a service response message sent by the second station device. When the first station device receives the service response message sent by the second station device, the first station device may determine that the second station device supports the first service. The first station device sends the service announcement message by means of broadcast in a DW. For the DW, refer to a DW in an NAN network in the other approaches, and details are not described herein.

Optionally, if the first station device may provide the first service, the service announcement message may be a service provision message, and the service provision message is used to indicate that the first station device provides the first service. After the second station device receives the service provision message, if the second station device requires the first service, the service response message is a service requirement message, and the service requirement message is used to indicate that the second station device requires the first service. If the first station device requires the first service, the service announcement message may be a service requirement message, and the service requirement message is used to indicate that the first station device requires the first service. After the second station device receives the service requirement message, if the second station device may provide the first service, the service response message is a service provision message, and the service provision message is used to indicate that the second station device provides the first service. The service provision message may be, for example, a Publish message in NAN, and the service requirement message may be, for example, a Subscribe message or a Follow-up message in NAN.

Step S102: The first station device receives a device group join request message that is sent by the second station device according to a multicast MAC address of a first device group.

In this embodiment, after the second station device determines that the first station device supports the first service, the second station device sends the device group join request message to the first device group according to the multicast MAC address of the first device group, the first device group is a device group of the first service and the first device group is a device group to which the first station device belongs. That is, the second station device sends the device group join request message to a station device in the first device group by means of multicast according to the multicast MAC address of the first device group, the first station device belonging to the first device group receives the device group join request message, and the device group join request message is used to request to join the first device group. The device group join request message may further be a Provision Discovery Request message, another customized message or the like.

Step S103: The first station device sends a device group join response message to another station device in the first device group and the second station device according to the multicast MAC address of the first device group in a contention transmission manner.

In this embodiment, the first station device sends the device group join response message according to the multicast address of the first device group in a contention transmission manner. That is, the first station device sends a service join response message to another station device in the first device group and the second station device by means of multicast according to the multicast MAC address of the first device group. The device group join response message is used to allow the second station device to join the first device group.

An optional implementation manner in which the first station device sends the device group join response message to the other station device in the first device group and the second station device according to the multicast MAC address of the first device group in a contention transmission manner includes when the first station device does not receive, in a contention backoff process, a device group join response message sent by the other station device in the first device group, the first station device sends the device group join response message to the other station device in the first device group and the second station device according to the multicast MAC address of the first device group after the contention backoff process ends. Optionally, if the first station device receives, in the contention backoff process, a device group join response message sent by the other station device in the first device group, the first station device does not send the device group join response message to the other station device in the first device group and the second station device after the contention backoff process ends. Further, the contention backoff process indicates that the first station device prepares a to-be sent service join response message, and generates a random number, and after the first station device listens and detects that a transmission channel has been idle for a first predetermined time, the first station device determines to begin backoff, and the random number is reduced by 1 after every second predetermined time. If the random number is not zero, the first station device determines once whether the transmission channel is busy or idle. If the transmission channel is busy, the first station device receives a message sent by another station device. If the received message is the device group join response message of the first device group, it indicates that in the contention backoff process, the first station device receives the device group join response message sent by the other station device in the first device group, and then the first station device stops backoff and cancels sending the device group join response message prepared by the first station device. If the transmission channel is idle, the random number is reduced by 1 again after a second predetermined time. If the transmission channel is always idle when the random number is reduced to 0, or the transmission channel is busy, but the message that is sent by the other station device and that is received by the first station device is not the device group join response message, it indicates that in the contention backoff process, the first station device does not receive the device group join response message sent by the other station device in the first device group, and then after the random number is reduced to 0 (the contention backoff process ends), the first station device sends the device group join response message to the other station device in the first device group and the second station device according to the multicast MAC address of the first device group.

In this embodiment, the first station device does not receive, in the contention backoff process, a device group join response message sent by the other station device in the first device group such that the first station device sends the device group join response message to the other station device in the first device group and the second station device according to the multicast MAC address of the first device group. Correspondingly, because of receiving the device group join response message sent by the first station device, the other station device in the first device group stops sending the device group join response message by means of multicast. The second station device receives the device group join response message sent by the first station device such that the second station device joins the first device group.

Step S104: The first station device performs data transmission of the first service with the second station device in a service window of the first service.

In this embodiment, after the second station device joins the first device group, the first station device may perform data transmission of the first service with the second station device in the service window of the first service. For example, the first station device may perform data transmission of the first service with the second station device in the service window of the first service in a multicast form or a unicast form. The service window is a window in which service data transmission is performed, and the window indicates a time and a channel for performing service data transmission.

According to the data transmission method provided in this embodiment, a first station device determines that a second station device supports a first service, receives a device group join request message that is sent by the second station device according to a multicast MAC address of a first device group, and then sends a device group join response message to another station device in the first device group and the second station device according to the multicast MAC address of the first device group in a contention transmission manner such that the second station device joins the first device group, and then the first station device performs data transmission of the first service with the second station device in a service window of the first service. After service discovery, a station device needing to perform data transmission of a same service is added to a same device group in the manner. Therefore, station devices belonging to the same device group perform service data transmission, no other data transmission network needs to be further established to implement service data transmission such that service data can be transmitted in time, thereby improving transmission efficiency.

Figure 2:
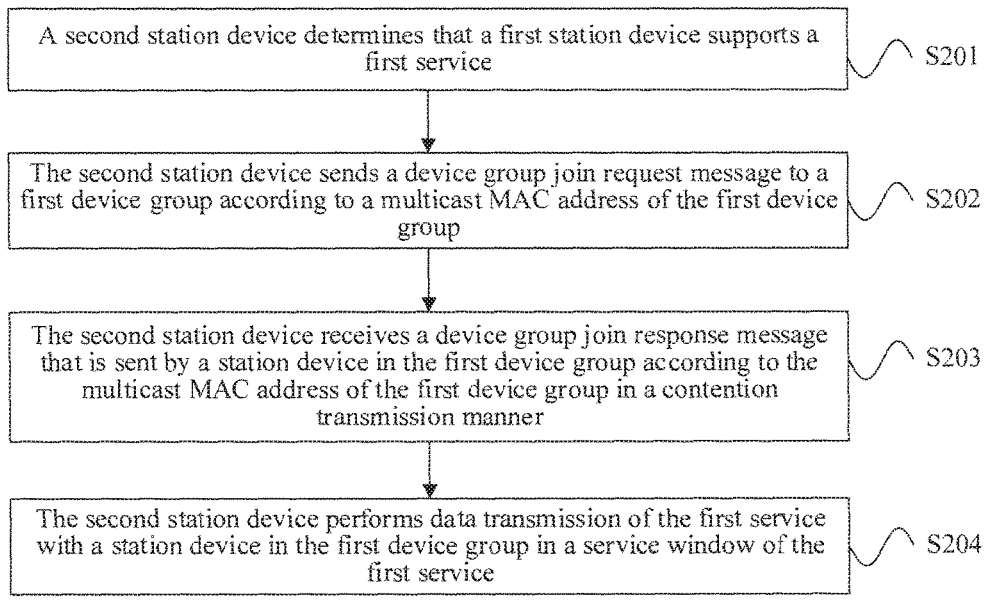
FIG. 2 is a flowchart of Embodiment 2 of a data transmission method according to the present disclosure.

FIG. 2 is a flowchart of Embodiment 2 of a data transmission method according to the present disclosure. As shown in FIG. 2, the method of this embodiment may include the following steps.

Step S201: A second station device determines that a first station device supports a first service.

In this embodiment, if the first station device supports the first service, the second station device may determine that the first station device supports the first service.

An optional implementation manner in which the second station device determines that the first station device supports the first service includes that the second station device receives a service announcement message that is sent by the first station device by means of broadcast, where the service announcement message includes identifier information of the first service and information about a service window of the first service, the service window includes a time and/or a channel of service transmission, and the service announcement message is used to indicate that the first station device supports the first service. If the second station device supports the first service, the second station device sends a service response message to the first station device. Therefore, the second station device may determine that the first station device supports the first service. The second station device receives, in a DW, the service announcement message that is sent by the first station device by means of broadcast. For the DW, refer to a DW in an NAN network in the other approaches, and details are not described herein.

Optionally, the service announcement message received by the first station device is a service provision message, and the service provision message is used to indicate that the first station device provides the first service. If the second station device requires the first service, the service response message is a service requirement message, and the service requirement message is used to indicate that the second station device requires the first service. The service announcement message received by the first station device is a service requirement message, and the service requirement message is used to indicate that the first station device requires the first service. If the second station device may provide the first service, the service response message is a service provision message, and the service provision message is used to indicate that the second station device provides the first service.

Optionally, before sending the service response message to the first station device, the second station device may further display that the service announcement message sent by the first station device is received, and send the service response message after a user performs acknowledgement. That is, when the user needs to perform data transmission of the first service with the first station device, the second station device sends the service response message, or the second station device does not send the service response message when the user does not need to perform data transmission of the first service with the first station device.

Step S202: The second station device sends a device group join request message to a first device group according to a multicast MAC address of the first device group.

In this embodiment, the second station device determines that the first station device supports the first device group. The second station device sends the device group join request message to the first device group according to the multicast MAC address of the first device group, the first device group is a device group of the first service and the first device group is a device group to which the first station device belongs. That is, the second station device sends the device group join request message to a station device in the first device group by means of multicast according to the multicast MAC address of the first device group, and the device group join request message is used to request to join the first device group.

Step S203: The second station device receives a device group join response message that is sent by a station device in the first device group according to the multicast MAC address of the first device group in a contention transmission manner.

In this embodiment, each station device belonging to the first device group receives the device group join request message sent by the second station device, and then a station device in the first device group sends the device group join response message to another station device in the first device group and the second station device according to the multicast MAC address of the first device group in a contention transmission manner, where the device group join request message is used to request to join the first device group. Correspondingly, the second station device receives the device group join response message such that the second station device joins the first device group. A station device in the first device group sends the device group join response message in a multicast manner, and therefore each other station device in the first device group receives the device group join response message such that each other station device does not send the device group join response message to the first device group according to the multicast MAC address of the first device group. A station device in the first device group may be the first station device, and this embodiment is not limited thereto.

An example in which the first station device sends a service group join response message is used. An optional implementation manner in which the first station device sends the device group join response message to the other station device in the first device group and the second station device according to the multicast MAC address of the first device group in a contention transmission manner includes when the first station device does not receive, in a contention backoff process, a device group join response message sent by the other station device in the first device group, the first station device sends the device group join response message to the other station device in the first device group and the second station device according to the multicast MAC address of the first device group after the contention backoff process ends. Further, the contention backoff process indicates that the first station device prepares a to-be sent service join response message, and generates a random number, and after the first station device listens and detects that a transmission channel has been idle for a first predetermined time, the first station device determines to begin backoff, and the random number is reduced by 1 after every second predetermined time. If the random number is not zero, the first station device determines once whether the transmission channel is busy or idle. If the transmission channel is busy, the first station device receives a message sent by another station device. If the received message is the device group join response message of the first device group, it indicates that in the contention backoff process, the first station device receives the device group join response message sent by the other station device in the first device group, and then the first station device stops backoff and cancels sending the device group join response message prepared by the first station device. If the transmission channel is idle, the random number is reduced by 1 again after a second predetermined time. If the transmission channel is always idle when the random number is reduced to 0, or the transmission channel is busy, but the message that is sent by the other station device and that is received by the first station device is not the device group join response message, it indicates that in the contention backoff process, the first station device does not receive the device group join response message sent by the other station device in the first device group, and then after the random number is reduced to 0 (the contention backoff process ends), the first station device sends the device group join response message to the other station device in the first device group and the second station device according to the multicast MAC address of the first device group.

Step S204: The second station device performs data transmission of the first service with a station device in the first device group in a service window of the first service.

In this embodiment, after the second station device joins the first device group, the second station device may perform data transmission of the first service with the first station device in the service window of the first service. For example, the second station device may perform data transmission of the first service with a station device in the first device group (for example, the first station device or another station device) in the service window of the first service in a multicast form or a unicast form. The service window is a window in which service data transmission is performed, and the window indicates a time and a channel for performing service data transmission.

According to the data transmission method provided in this embodiment, a second station device determines that a first station device supports a first service, then sends a device group join request message to a first device group according to a multicast MAC address of the first device group, and receives a device group join response message that is sent by a station device in the first device group according to the multicast MAC address of the first device group in a contention transmission manner such that the second station device joins the first device group, and then performs data transmission of the first service with a station device in the first device group in a service window of the first service. After service discovery, a station device needing to perform data transmission of a same service is added to a same device group in the manner. Therefore, station devices belonging to the same device group perform service data transmission, no other data transmission network needs to be further established to implement service data transmission such that service data can be transmitted in time, thereby improving transmission efficiency.

Figure 3:
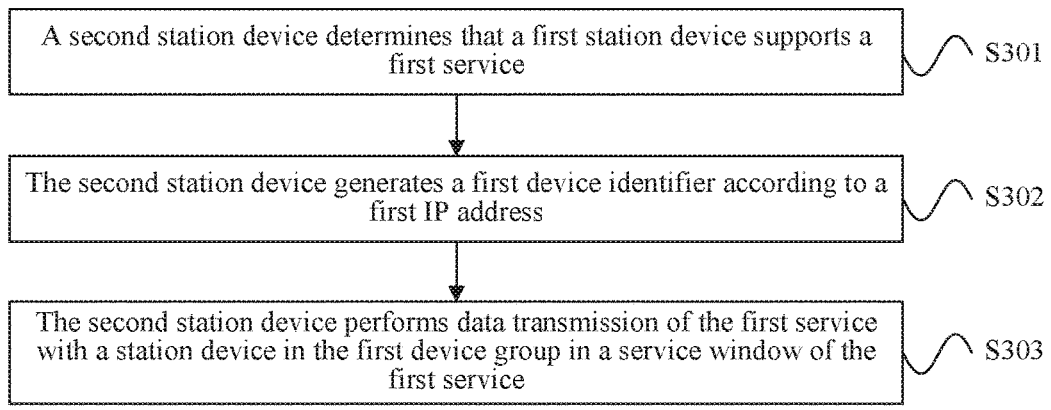
FIG. 3 is a flowchart of Embodiment 3 of a data transmission method according to the present disclosure.

FIG. 3 is a flowchart of Embodiment 3 of a data transmission method according to the present disclosure. As shown in FIG. 3, the method of this embodiment may include the following steps.

Step S301: A second station device determines that a first station device supports a first service.

In this embodiment, for step S301, refer to a related record in Embodiment 1 or 2 of the method of the present disclosure, and details are not described herein again.

Step S302: The second station device generates a first device identifier according to a first IP address.

In this embodiment, after the second station device determines that the first station device supports the first service, the second station device generates the first device identifier according to the first IP address, the first IP address is an IP address of the second station device, and the first device identifier is an identifier of the second station device in a first device group. The second station device obtains the device identifier of the second station device in the first device group, and therefore the second station device joins the first device group.

The second station device generates the first device identifier using the following optional implementation solution.

In a first optional implementation solution, the second station device generates the first device identifier according to a host address of the first IP address. If a value of the host address is not excessively large, the value of the host address in the IP address is directly used as the first device identifier. For example, if the IP address is 192.168.0.12, where a network address is 192.168.0, and the host address is 12, the first device identifier is 12.

In a second optional implementation solution, the second station device may perform a Hash operation on the first IP address to obtain a value, and the value is used as the first device identifier.

In a third optional implementation solution, the second station device may perform a Hash operation on a MAC address of the first device identifier to obtain a value, and the value is used as the first device identifier.

The Hash algorithm mentioned in the two solutions may be the common Message Digest Algorithm version 5 (MD5), the Secure Hash Algorithm (SHA) or the like. After a corresponding Hash value is obtained, the Hash value is converted into a value in a preset range, the value is used as the first device identifier, and the conversion process may be intercept processing, a modulo operation or the like.

Optionally, on the basis of the optional implementation solutions, after the second station device obtains the first device identifier, the second station device further performs identifier conflict detection on the first device identifier in the first device group. When no identifier conflict exists for the first device identifier in the first device group, which indicates that a device identifier of another station device in the first device group is not the same as the device identifier of the second station device, the second station device uses the first device identifier as the device identifier of the second station device in the first device group. If an identifier conflict exists for the first device identifier in the first device group, which indicates that a device identifier of another station device in the first device group is the same as the device identifier of the second station device, the second station device generates a device identifier again. For example, the second station device performs an operation according to the first IP address or the MAC address of the second station device again, then performs compression processing to obtain a value, and then performs identifier conflict detection, until no identifier conflict exists. The performing an operation again includes performing an operation by adding a variable on the basis of the IP address or the MAC address, and a new value may be obtained.

Performing, by the second station device, identifier conflict detection on the first device identifier in the first device group includes sending, by the second station device, an identifier conflict detection packet to the first device group (by means of multicast) according to the multicast MAC address of the first device group, where the identifier conflict detection packet includes the first device identifier. If the second station device receives an identifier conflict response packet, it indicates that an identifier conflict exists for the first device identifier in the first device group. If the second station device receives no identifier conflict response packet, it indicates that no identifier conflict exists for the first device identifier in the first device group.

Optionally, before the second station device performs step S302, the second station device may obtain the first IP address, and an optional implementation manner may include that the second station device generates a first IP address according to an IP address prefix of the first device group and a host address of the second station device. Further, after the second station device receives the device group join response message sent by the first station device, the second station device generates the first IP address according to the IP address prefix of the first device group and the host address of the second station device, and the first IP address is the IP address of the first station device in the first device group. For example, if the IP address prefix of the first device group is 192.168.2, and the host address of the second station device is 188, the first IP address is 192.168.2.188.

Step S303: The second station device performs data transmission of the first service with a station device in the first device group in a service window of the first service.

In this embodiment, for a specific implementation process of step S303, refer to a related record in Embodiment 2 of the method of the present disclosure, and details are not described herein again.

According to the data transmission method provided in this embodiment, a second station device determines that a first station device supports a first service, and then generates a first device identifier according to an IP address of the second station device such that the second station device joins a first device group, and then performs data transmission of the first service with a station device in the first device group in a service window of the first service. After service discovery, a station device needing to perform data transmission of a same service is added to a same device group in the manner. Therefore, station devices belonging to the same device group perform service data transmission, no other data transmission network needs to be further established to implement service data transmission such that service data can be transmitted in time, thereby improving transmission efficiency.

Optionally, on the basis of Embodiment 3 of the method of the present disclosure, after step S302 is performed and before step S303 is performed, the second station device may further send a device identifier notification message to the first device group according to a multicast MAC address of the first device group, and the device identifier notification message includes the first device identifier such that a station device in the first device group obtains a device identifier of the second station device in the first device group, and then determines that the second station device has joined the first device group.

Figure 4:
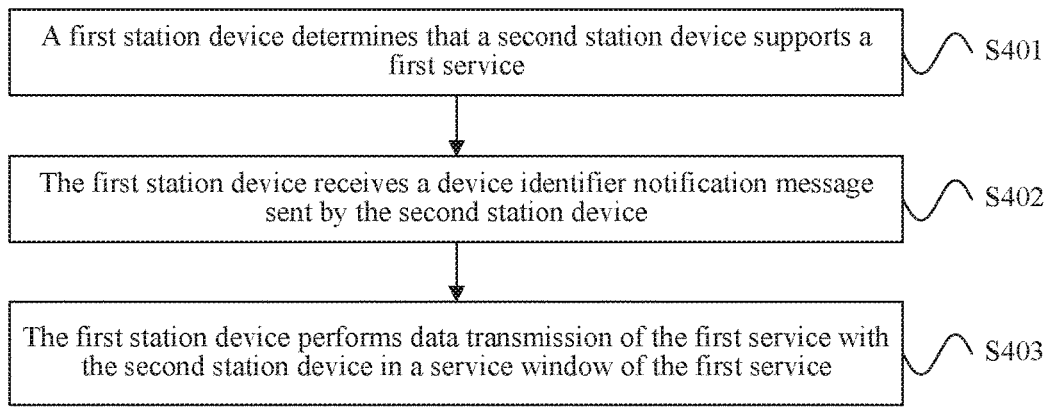
FIG. 4 is a flowchart of Embodiment 4 of a data transmission method according to the present disclosure.

FIG. 4 is a flowchart of Embodiment 4 of a data transmission method according to the present disclosure. As shown in FIG. 4, the method of this embodiment may include the following steps.

Step S401: A first station device determines that a second station device supports a first service.

In this embodiment, for step S401, refer to a related record in Embodiment 1 of the method of the present disclosure, and details are not described herein again.

Step S402: The first station device receives a device identifier notification message sent by the second station device.

In this embodiment, the device identifier notification message includes a first device identifier, and the first device identifier is a device identifier of the second station device in a first device group. The first device group is a device group of the first service and is a device group to which the first station device belongs. The first station device may obtain the device identifier of the second station device in the first device group according to the device identifier notification message, thereby determining that the second station device has joined the first device group.

Step S403: The first station device performs data transmission of the first service with the second station device in a service window of the first service.

In this embodiment, for a specific implementation process of the step S403, refer to a related record in Embodiment 1 of the method of the present disclosure, and details are not described herein again.

According to the data transmission method provided in this embodiment, a first station device determines that a second station device supports a first service, then receives a device identifier notification message that includes a first device identifier and that is sent by the second station device, and therefore may determine that the second station device has joined a first device group, and the first station device then performs data transmission of the first service with the second station device in a service window of the first service. After service discovery, a station device needing to perform data transmission of a same service is added to a same device group. Therefore, station devices belonging to the same device group perform service data transmission, no other data transmission network needs to be further established to implement service data transmission such that service data can be transmitted in time, thereby improving transmission efficiency.

Figure 5:
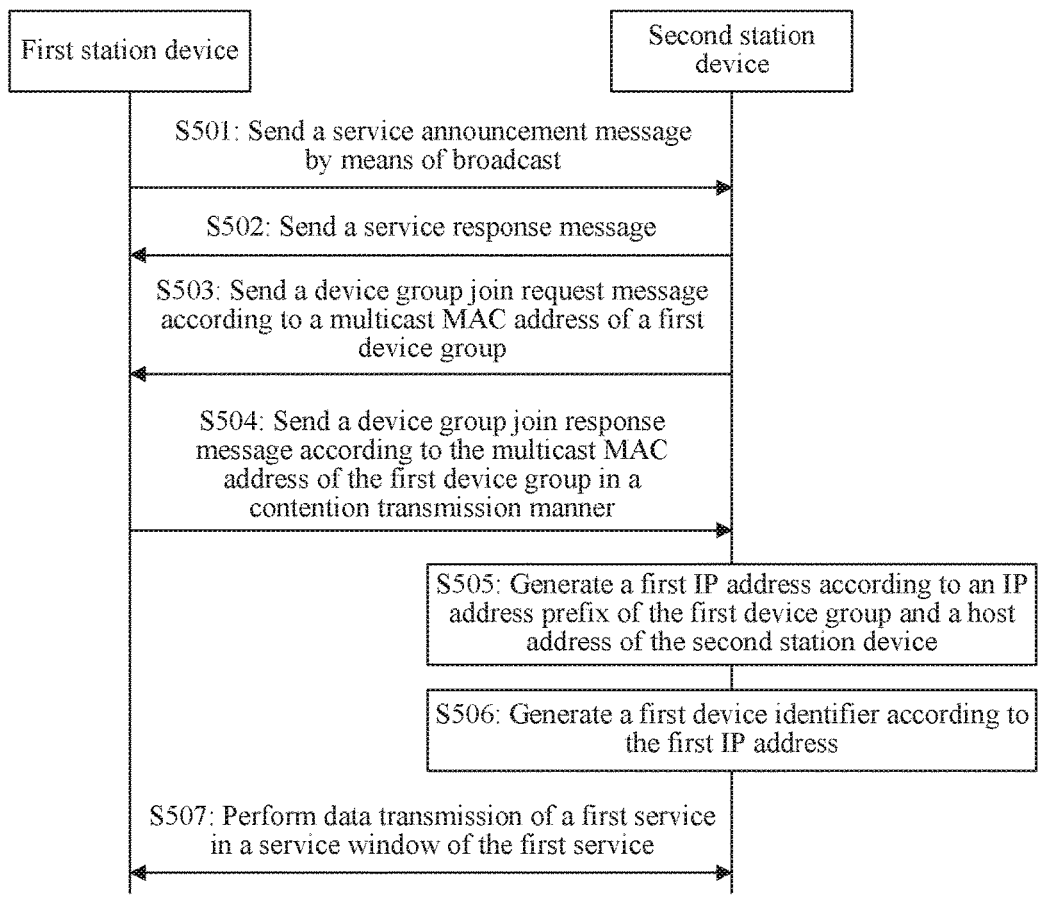
FIG. 5 is a flowchart of Embodiment 5 of a data transmission method according to the present disclosure.

FIG. 5 is a flowchart of Embodiment 5 of a data transmission method according to the present disclosure. As shown in FIG. 5, the method of this embodiment may include the following steps.

Step S501: A first station device sends a service announcement message by means of broadcast to a second station device.

Step S502: The second station device sends a service response message to the first station device.

In this embodiment, for steps S501 and S502, refer to a related record in Embodiment 1 or 2 of the method of the present disclosure, and details are not described herein again.

Optionally, the second station device may send the service response message to the first station device in a service window of a first service. Correspondingly, the first station device may receive, in the service window of the first service, the service response message sent by the second station device.

Optionally, after the second station device sends the service response message to the first station device, the first station device may further send a service response acknowledgement message to the second station device, where the service response message acknowledgement message is used to indicate that the first station device joins a first device group, and then step S503 is performed. Optionally, the service response acknowledgement message may include at least one of a multicast MAC address of the first device group, identifier information of the first device group, or an IP address prefix of the first device group.

By mean of steps S501 and S502, the first station device may determine that the second station device supports the first service, and the second station device may determine that the first station device supports the first service. Then, the second station device may join the first device group, and an optional implementation manner in which the second station device joins the first device group includes steps S503 to S506.

Step S503: The second station device sends a device group join request message the first station device according to a multicast MAC address of the first device group.

Optionally, the service announcement message may include the multicast MAC address of the first device group, and the second station device obtains the multicast MAC address of the first device group from the service announcement message, and then sends the device group join request message to the first device group according to the multicast MAC address of the first device group.

Optionally, the service announcement message may include the identifier information of the first device group, and the second station device obtains the identifier information of the first device group from the service announcement message, then obtains the multicast MAC address of the first device group according to the identifier information of the first device group (for example, a mapping relationship exists between the identifier information of the first device group and the multicast MAC address of the first device group), and then sends the device group join request message to the first device group according to the multicast MAC address of the first device group.

Optionally, the service announcement message may include the multicast MAC address of the first device group and the identifier information of the first device group.

Step S504: The first station device sends a device group join response message to another station device in the first device group and the second station device according to the multicast MAC address of the first device group in a contention transmission manner.

In this embodiment, for a specific implementation process of step S504, refer to a related record in Embodiment 1 of the method of the present disclosure, and details are not described herein again.

Step S505: The second station device generates a first IP address according to an IP address prefix of the first device group and a host address of the second station device.

In this embodiment, for a specific implementation process of step S505, refer to a related record in Embodiment 3 of the method of the present disclosure, and details are not described herein again.

Optionally, before the second station device performs step S505, the second station device may further obtain the host address of the second station device, which includes that the second station device may randomly generate the host address of the second station device, or the second station device generates the host address of the second station device according to the MAC address of the second station device. For example, the second station device performs a Hash operation on the MAC address to generate the host address. The Hash operation may be a conventional Hash algorithm such as MD5 or SHA, and an input value of the Hash algorithm may be a MAC address. Optionally, an input value of the Hash operation may be a MAC address plus another information, such as a value x such that when a conflict exists for a host address obtained by means of Hash operation processing in conflict monitoring for a finally generated IP address, a Hash operation may be performed again by changing the value x to obtain a new host address.

Optionally, in this embodiment, to avoid that the first IP address generated by the second station device is the same as an IP address, in the first device group, of another station device in the first device group to cause an IP address conflict, after step S505 is performed in this embodiment, the second station device performs IP address conflict detection on the first IP address in the first device group. When no IP address conflict exists for the first IP address in the first device group, the second station device uses the first IP address as an IP address of the second station device. In this embodiment, after generating the first IP address, the second station device further performs IP address conflict detection on the first IP address in the first device group. When no IP address conflict exists for the first IP address in the first device group, which indicates that the IP address of the other station device in the first device group is not the same as the IP address of the second station device, the second station device uses the first IP address as the IP address of the second station device. If an IP address conflict exists for the first IP address in the first device group, which indicates that the IP address of the other station device in the first device group is the same as the IP address of the second station device, the second station device generates an IP address again. For example, the second station device obtains a MAC address again, and then performs IP address conflict detection, until no IP address conflict exists. The performing, by the second station device, IP address conflict detection on the first IP address in the first device group further includes sending, by the second station device, an IP address conflict detection packet to the first device group (by means of multicast) according to the multicast MAC address of the first device group, where the IP address conflict detection packet includes the first IP address. If the second station device receives an IP address conflict response packet, it indicates that an IP address conflict exists for the first IP address in the first device group. If the second station device receives no IP address conflict response packet, it indicates that no IP address conflict exists for the first IP address in the first device group.

Optionally, the service announcement message includes the IP address prefix of the first device group, or the device group join response message includes the IP address prefix of the first device group such that the second terminal device may obtain the IP address prefix of the first device group from the service announcement message or the device group join response message, and then step S505 is performed.

Step S506: The second station device generates a first device identifier according to the first IP address.

In this embodiment, for a specific implementation process of step S506, refer to a related record in Embodiment 3 of the method of the present disclosure, and details are not described herein again.

Step S507: The first station device performs data transmission of the first service with the second station device in a service window of the first service.

In this embodiment, for a specific implementation process of step S507, refer to a related record in Embodiment 1 or 2 of the method of the present disclosure, and details are not described herein again. It should be noted that, the first station device may perform data transmission of the first service with a station device in the first device group in a service window of the first service, the second station device may perform data transmission of the first service with a station device in the first device group in a service window of the first service, and an example in which the first station device performs data transmission of the first service with the second station device in a service window of the first service is used to perform description herein.

According to the data transmission method provided in this embodiment, a first station device and a second station device respectively determine that the second station device and the first station device support a first service, the second station device requests from a first device group to join the first device group, and after receiving a response message sent by a station device in the first device group, the second station device generates an IP address of the second station device according to an IP address prefix of the first device group and a host address of the second station device, and generates a device identifier of the second station device in the first device group according to the IP address of the second station device such that the second station device joins the first device group, and then the first station device performs data transmission of the first service with the second station device in a service window of the first service. After service discovery, a station device needing to perform data transmission of a same service is added to a same device group. Therefore, station devices belonging to the same device group perform service data transmission, no other data transmission network needs to be further established to implement service data transmission such that service data can be transmitted in time, thereby improving transmission efficiency.

Figure 6:
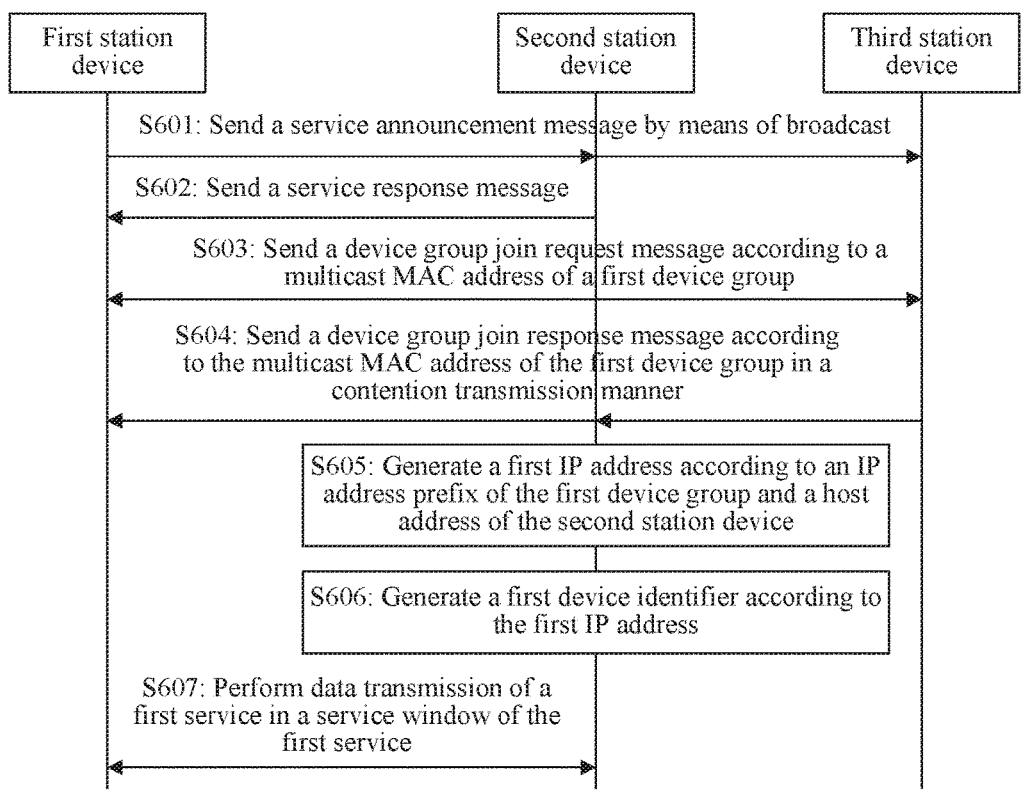
FIG. 6 is a flowchart of Embodiment 6 of a data transmission method according to the present disclosure.

FIG. 6 is a flowchart of Embodiment 6 of a data transmission method according to the present disclosure. As shown in FIG. 6, the method of this embodiment may include the following steps.

Step S601: A first station device sends a service announcement message by means of broadcast.

Step S602: A second station device sends a service response message to the first station device.

Step S603: The second station device sends a device group join request message to the first station device and a third station device according to a multicast MAC address of the first device group.

In this embodiment, for a specific implementation process of steps S601 to S603, refer to a related record in Embodiment 5 of the method of the present disclosure, and details are not described herein again.

Step S604: A third station device sends a device group join response message to the first station device in the first device group and the second station device according to the multicast MAC address of the first device group in a contention transmission manner.

In this embodiment, the third station device is any station device in the first device group other than the first station device and the second station device, the third station device receives the device group join request message that is sent by the first station device by means of multicast, and the third station device sends the device group join response message according to the multicast address of the first device group in a contention transmission manner. That is, the third station device sends a service join response message to another station device in the first device group and the second station device by means of multicast according to the multicast MAC address of the first device group. The device group join response message is used to allow the second station device to join the first device group.

An optional implementation manner in which the third station device sends the device group join response message to the other station device in the first device group and the second station device according to the multicast MAC address of the first device group in a contention transmission manner includes that when the third station device does not receive, in a contention backoff process, a device group join response message sent by the other station device in the first device group, the third station device sends the device group join response message to the other station device in the first device group and the second station device according to the multicast MAC address of the first device group after the contention backoff process ends. Further, the contention backoff process indicates that the third station device prepares a to-be sent service join response message, and generates a random number, and after the third station device listens and detects that a transmission channel has been idle for a first predetermined time, the third station device determines to begin backoff, and the random number is reduced by 1 after every second predetermined time. If the random number is not zero, the first station device determines once whether the transmission channel is busy or idle. If the transmission channel is busy, the third station device receives a message sent by another station device. If the received message is the device group join response message of the first device group, it indicates that in the contention backoff process, the third station device receives the device group join response message sent by the other station device in the first device group, and then the third station device stops backoff and cancels sending the device group join response message prepared by the third station device. If the transmission channel is idle, the random number is reduced by 1 again after a second predetermined time. If the transmission channel is always idle when the random number is reduced to 0, or the transmission channel is busy, but the message that is sent by the other station device and that is received by the third station device is not the device group join response message, it indicates that in the contention backoff process, the third station device does not receive the device group join response message sent by the other station device in the first device group, and then after the random number is reduced to 0 (the contention backoff process ends), the third station device sends the device group join response message to the other station device in the first device group and the second station device according to the multicast MAC address of the first device group.

In this embodiment, the third station device does not receive, in the contention transmission process, a device group join response message sent by the other station device in the first device group such that the third station device sends the device group join response message to the other station device in the first device group and the second station device according to the multicast MAC address of the first device group. Correspondingly, others station devices in the first device group (for example, the first station device and the second station device) receive the device group join response message sent by the third station device.

In this embodiment, the first station device receives, in the contention backoff process of the first station device, the device group join response message that is sent by the third station device by means of multicast such that the first station device does not send the device group join response message to the first device group according to the multicast MAC address of the first device group. It should be noted that, no other station device in the first device group other than the third station device sends the device group join response message, and the first station device is used as an example herein to perform description.

Step S605: The second station device generates a first IP address according to an IP address prefix of the first device group and a host address of the second station device.

In this embodiment, after the second station device receives the device group join response message sent by the third station device, the second station device performs step S605. For a specific implementation process of step S605, refer to a related record of step S505 in Embodiment 5 of the method of the present disclosure, and details are not described herein again.

It should be noted that, steps S605 and S606 are not performed in sequence.

Step S606: The second station device generates a first device identifier according to the first IP address.

In this embodiment, for a specific implementation process of step S606, refer to a related record in Embodiment 3 of the method of the present disclosure, and details are not described herein again.

Step S607: The first station device performs data transmission of the first service with the second station device in a service window of the first service.

In this embodiment, for a specific implementation process of step S607, refer to a related record in Embodiment 1 or 2 of the method of the present disclosure, and details are not described herein again. It should be noted that, the first station device may perform data transmission of the first service with a station device in the first device group (for example, the second station device, or the third station device) in a service window of the first service, the second station device may perform data transmission of the first service with a station device in the first device group (for example, the first station device, or the third station device) in a service window of the first service, and an example in which the first station device performs data transmission of the first service with the second station device in a service window of the first service is used to perform description herein.

According to the data transmission method provided in this embodiment, a first station device and a second station device respectively determine that the second station device and the first station device support a first service, the second station device requests from a first device group to join the first device group, and after receiving a response message sent by a station device in the first device group in a contention transmission manner, the second station device generates an IP address of the second station device according to an IP address prefix of the first device group and a host address of the second station device, and generates a device identifier of the second station device in the first device group according to the IP address of the second station device such that the second station device joins the first device group, and then the first station device performs data transmission of the first service with the second station device in a service window of the first service. After service discovery, a station device needing to perform data transmission of a same service is added to a same device group. Therefore, station devices belonging to the same device group perform service data transmission, no other data transmission network needs to be further established to implement service data transmission such that service data can be transmitted in time, thereby improving transmission efficiency.

Figure 7:
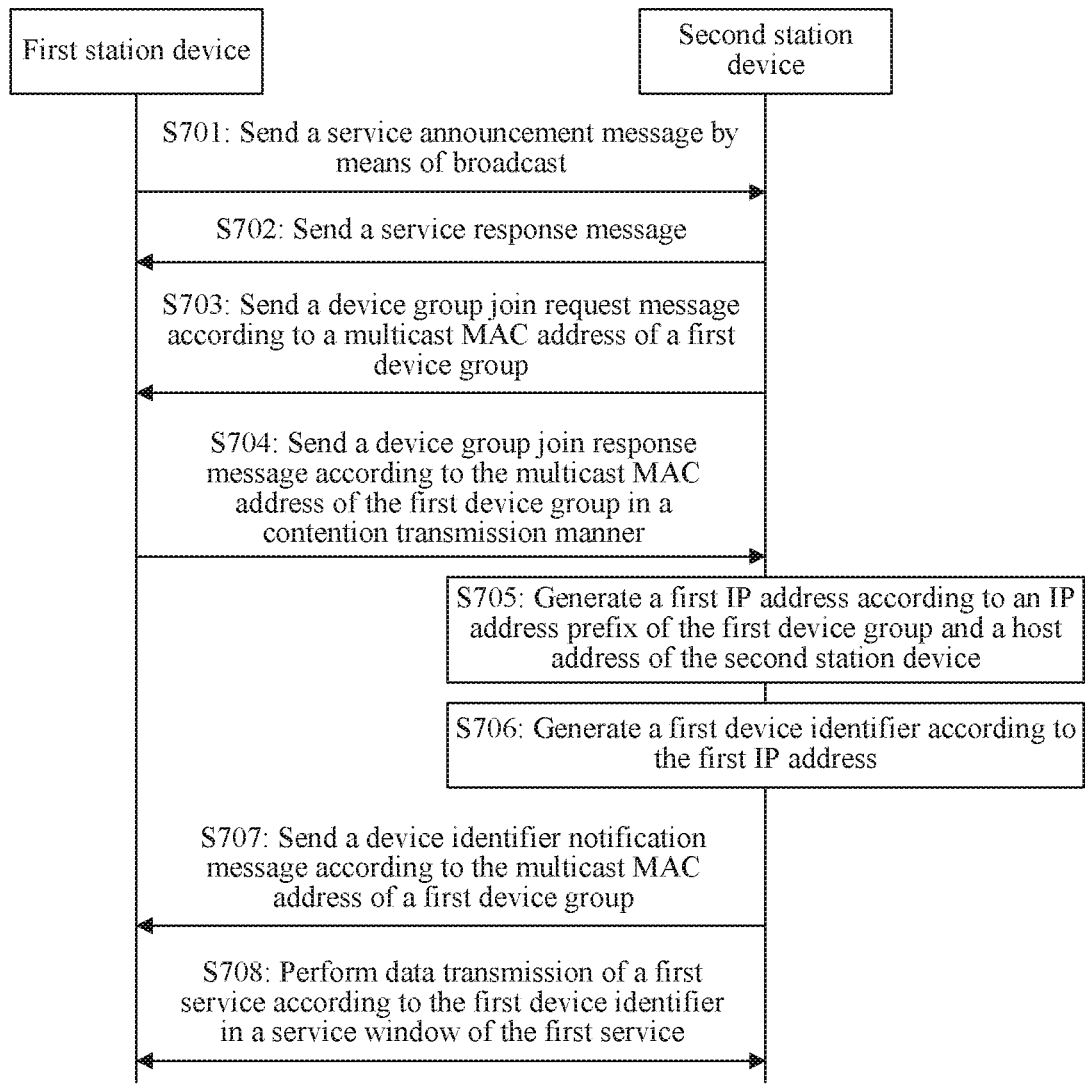
FIG. 7 is a flowchart of Embodiment 7 of a data transmission method according to the present disclosure.

FIG. 7 is a flowchart of Embodiment 7 of a data transmission method according to the present disclosure. As shown in FIG. 7, the method of this embodiment may include the following steps.

Step S701: A first station device sends a service announcement message by means of broadcast to a second station device.

Step S702: The second station device sends a service response message to the first station device.

In this embodiment, for steps S701 and S702, refer to a related record in Embodiment 1 or 2 of the method of the present disclosure, and details are not described herein again.

By mean of steps S701 and S702, the first station device may determine that the second station device supports a first service, and the second station device may determine that the first station device supports the first service. Then, the second station device may join a first device group, and an optional implementation manner in which the second station device joins the first device group includes steps S703 to S706.

Step S703: The second station device sends a device group join request message to a first station device according to a multicast MAC address of the first device group.

Step S704: The first station device sends a device group join response message to another station device in the first device group and the second station device according to the multicast MAC address of the first device group in a contention transmission manner.

Step S705: The second station device generates a first IP address according to an IP address prefix of the first device group and a host address of the second station device.

Optionally, steps S703 to S705 may be replaced with steps S603 to S605 in Embodiment 3 of the method of the present disclosure.

Step S706: The second station device generates a first device identifier according to the first IP address.

In this embodiment, for a specific implementation process of steps S703 to S706, refer to a related record in Embodiment 5 of the method of the present disclosure, and details are not described herein again.

Step S707: The second station device sends a device identifier notification message to the first station device according to the multicast MAC address of the first device group.

In this embodiment, after the second station device generates the first device identifier, the second station device adds the first device identifier to the device identifier notification message, and sends the device identifier notification message to the first device group according to the multicast MAC address of the first device group such that a station device in the first device group receives the device identifier notification message that is sent by the second station device by means of multicast, may obtain the device identifier of the second station device in the first device group, and therefore may determine that the second station device has joined the first device group.

After step S707 is performed, the second station device may perform data transmission of the first service with a station device in the first device group in the service window of the first service. In this embodiment, an example in which the second station device performs data transmission of the first service with the first station device in the service window of the first service is used to perform description, and an optional manner is step S708 described as follows.

Step S708: The first station device performs data transmission of the first service with the second station device according to the first device identifier in a service window of a first service.

In this embodiment, after the first station device obtains the device identifier of the second station device in the first device group (that is, the first device identifier), the first station device performs data transmission of the first service with the second station device in a unicast form according to the first device identifier in the service window of the first service.

An example in which the second station device sends data of the first service to the first station device is used, the service window of the first service may include a service wakeup window of the first service and a service transmission window of the first service, and an optional implementation manner of the step S708 may include that a station device in the first device group is in a wakeup state in the service wakeup window of the first service, and a station device processing the wakeup state may transmit information. In this embodiment, the first station device sends a paging message to the first device group according to the multicast MAC address of the first device group in the service wakeup window of the first service, the paging message includes the first device identifier, the paging message is used to page the second station device corresponding to the first device identifier, and the second station device receives the paging message that is sent by the first station device by means of multicast according to the multicast MAC of the first device group, and determines whether a device identifier included in the paging message is the first device identifier. When the paging message includes the first device identifier, the second station device keeps the wakeup state in the service transmission window of the first service, the first station device sends data of the first service to the second station device in the service transmission window of the first service, and correspondingly, the second station device in the wakeup state receives, in the service window of the first service, the data of the first service sent by the second station device.

Optionally, if none of all paging messages received by the first station device in the service wakeup window of the first service includes the first device identifier, the first station device may be in a dormant state in the service transmission window of the first service, thereby reducing power consumption of the first station device.

According to the data transmission method provided in this embodiment, a first station device and a second station device respectively determine that the second station device and the first station device support a first service, the second station device requests from a first device group to join the first device group, and after receiving a response message sent by a station device in the first device group, the second station device generates an IP address of the second station device according to an IP address prefix of the first device group and a host address of the second station device, generates a device identifier of the second station device in the first device group according to the IP address of the second station device, and then multicasts the device identifier of the second station device in the first device group to each station device in the first device group such that the second station device joins the first device group, and then the first station device performs data transmission of the first service with a station device in the first device group in a service window of the first service. After service discovery, a station device needing to perform data transmission of a same service is added to a same device group. Therefore, station devices belonging to the same device group perform service data transmission, no other data transmission network needs to be further established to implement service data transmission such that service data can be transmitted in time, thereby improving transmission efficiency.

Optionally, on the basis of the foregoing embodiments of the present disclosure, after a first station device and a second station device respectively determine that the second station device and the first station device support a first service, the second station device may negotiate an attribute parameter of a first device group with the first station device. Further, the second station device sends a device group negotiation request message to the first device group according to a multicast MAC address of the first device group, where the device group negotiation request message may include the attribute parameter of the first device group suggested by the second station device, and then the second station device sends a device group negotiation response message, thereby completing negotiation of the attribute parameter of the first device group. The attribute parameter of the first device group may include, for example, information such as a service window of the first service.

Figure 8:
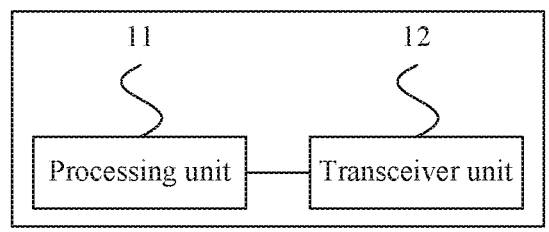
FIG. 8 is a schematic structural diagram of Embodiment 1 of a station device according to the present disclosure.

FIG. 8 is a schematic structural diagram of Embodiment 1 of a station device according to the present disclosure. As shown in FIG. 8, the station device of this embodiment may include a processing unit 11 and a transceiver unit 12. The processing unit 11 is configured to determine that a second station device supports a first service, and the transceiver unit 12 is configured to receive a device group join request message that is sent by the second station device according to a multicast MAC address of a first device group. The device group join request message is used to request to join the first device group, the station device in which the transceiver unit 12 is located, and each station device in the first device group supports the first service, send a device group join response message to another station device in the first device group and the second station device according to the multicast MAC address of the first device group in a contention transmission manner, where the device group join response message is used to allow the second station device to join the first device group, and perform data transmission of the first service with the second station device in a service window of the first service, where the service window includes a time and/or a channel of service transmission.

Optionally, sending a device group join response message to another station device in the first device group and the second station device according to the multicast MAC address of the first device group in a contention transmission manner includes sending a device group join response message to the other station device in the first device group and the second station device according to the multicast MAC address of the first device group after the contention backoff process ends when the device group join response message sent by the other station device in the first device group is not received in a contention backoff process. Optionally, if the first station device receives, in the contention backoff process, a device group join response message sent by the other station device in the first device group, the first station device does not send the device group join response message to the other station device in the first device group and the second station device after the contention backoff process ends.

Optionally, after the device group join response message is sent to the other station device in the first device group and the second station device according to the multicast MAC address of the first device group in the contention transmission manner, the transceiver unit 12 is further configured to receive a device identifier notification message sent by the second station device, where the device identifier notification message includes a first device identifier, and the first device identifier is a device identifier of the second station device in the first device group.

Optionally, the device group join response message includes an IP address prefix of the first device group.

Optionally, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or the IP address prefix of the first device group.

The station device of this embodiment may be configured to perform a technical solution performed by the first station device in the method embodiment shown in FIG. 1 or any one of FIG. 5 to FIG. 7, an implementation principle and a technical effect of this embodiment are similar to those of the technical solution, and details are not described herein again.

Figure 9:
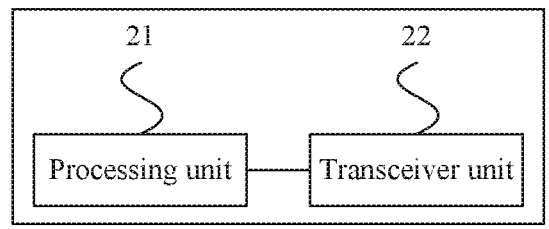
FIG. 9 is a schematic structural diagram of Embodiment 2 of a station device according to the present disclosure.

FIG. 9 is a schematic structural diagram of Embodiment 2 of a station device according to the present disclosure. As shown in FIG. 9, the station device of this embodiment may include a processing unit 21 and a transceiver unit 22. The processing unit 21 is configured to determine that a first station device supports a first service, where the station device in which the processing unit 21 is located supports the first service, and the transceiver unit 22 is configured to send a device group join request message to a first device group according to a multicast MAC address of the first device group. The device group join request message is used to request to join the first device group, the first device group includes the first station device, and each station device in the first device group supports the first service, receive a device group join response message that is sent by a station device in the first device group according to the multicast MAC address of the first device group in a contention transmission manner, where the device group join response message is used to allow the station device in which the transceiver unit 22 is located to join the first device group, and perform data transmission of the first service with a station device in the first device group in a service window of the first service, where the service window includes a time and/or a channel of service transmission.

Optionally, after the transceiver unit 22 receives the device group join response message that is sent by the station device in the first device group according to the multicast MAC address of the first device group in the contention transmission manner, the processing unit 21 is further configured to generate a first device identifier according to a first IP address, where the first IP address is an IP address of the station device in which the processing unit 21 is located, and the first device identifier is an identifier of the station device in which the processing unit 21 is located when the station device is in the first device group.

Optionally, before the first device identifier is generated according to the first IP address, the processing unit 21 is further configured to perform a Hash operation on a MAC address of the station device in which the processing unit 21 is located to generate a host address of the station device in which the processing unit 21 is located, and generate the first IP address according to an IP address prefix of the first device group and the host address of the station device in which the processing unit 21 is located.

Optionally, the device group join response message includes the IP address prefix of the first device group.

Optionally, generating a first device identifier according to a first IP address further includes generating the first device identifier according to the host address, in the first IP address, of the station device in which the processing unit 21 is located, or performing a Hash operation on the first IP address, to generate the first device identifier.

Optionally, after the processing unit 21 generates the first device identifier according to the first IP address, the transceiver unit 22 is further configured to send a device identifier notification message to the first device group according to the multicast MAC address of the first device group, where the device identifier notification message includes the first device identifier.

Optionally, determining that a first station device supports a first service further includes receiving a service announcement message that is sent by the first station device by means of broadcast, where the service announcement message includes identifier information of the first service, and the service announcement message includes information about the service window of the first service, and sending a service response message to the first station device, where the service announcement message includes at least one of the multicast MAC address of the first device group, identifier information of the first device group, or the IP address prefix of the first device group.

The station device of this embodiment may be configured to perform a technical solution performed by the second station device in the method embodiment shown in FIG. 2 or any one of FIG. 5 to FIG. 7, an implementation principle and a technical effect of this embodiment are similar to those of the technical solution, and details are not described herein again.

Figure 10:
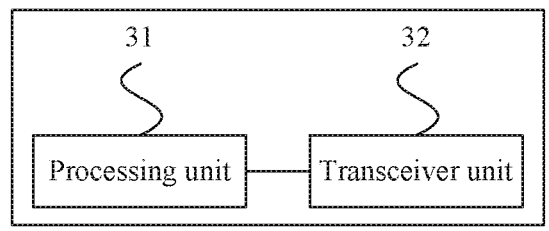
FIG. 10 is a schematic structural diagram of Embodiment 3 of a station device according to the present disclosure.

FIG. 10 is a schematic structural diagram of Embodiment 3 of a station device according to the present disclosure. As shown in FIG. 10, the station device of this embodiment may include a processing unit 31 and a transceiver unit 32. The processing unit 31 is configured to determine that a second station device supports a first service, and the transceiver unit 32 is configured to receive a device identifier notification message that is sent by the second station device according to a multicast MAC address of a first device group, where the device identifier notification message includes a first device identifier, the first device identifier is a device identifier of the second station device in the first device group, the first device group includes the station device in which the transceiver unit 32 is located, and each station device in the first device group supports the first service, and perform data transmission of the first service with the second station device in a service window of the first service, where the service window includes a time and/or a channel of service transmission.

Optionally, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or the IP address prefix of the first device group.

The station device of this embodiment may be configured to perform a technical solution performed by the first station device in the method embodiment shown in FIG. 4 or any one of FIG. 5 to FIG. 7, an implementation principle and a technical effect of this embodiment are similar to those of the technical solution, and details are not described herein again.

Figure 11:
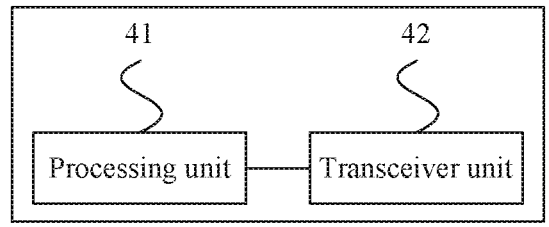
FIG. 11 is a schematic structural diagram of Embodiment 4 of a station device according to the present disclosure.

FIG. 11 is a schematic structural diagram of Embodiment 4 of a station device according to the present disclosure. As shown in FIG. 11, the station device of this embodiment may include a processing unit 41 and a transceiver unit 42. The processing unit 41 is configured to determine that a first station device supports a first service, where the station device in which the processing unit 41 is located supports the first service, and generate a first device identifier according to a first IP address, where the first IP address is an IP address of the station device in which the processing unit 41 is located, the first device identifier is an identifier of the station device in which the processing unit 41 is located when the station device is in a first device group, the device group join request message is used to request to join the first device group, the first device group includes the first station device, and each station device in the first device group supports the first service, and the transceiver unit 42 is configured to perform data transmission of the first service with a station device in the first device group in a service window of the first service, where the service window includes a time and/or a channel of service transmission.

Optionally, before the first device identifier is generated according to the first IP address, the processing unit 41 is further configured to perform a Hash operation on a MAC address of the station device in which the processing unit 41 is located to generate a host address of the station device in which the processing unit 41 is located, and generate the first IP address according to an IP address prefix of the first device group and the host address of the station device in which the processing unit 41 is located.

Optionally, generating a first device identifier according to a first IP address includes generating the first device identifier according to the host address, in the first IP address, of the station device in which the processing unit 41 is located, or performing a Hash operation on the first IP address, to generate the first device identifier.

Optionally, after the processing unit 41 generates the first device identifier according to the first IP address, the transceiver unit 42 is further configured to send a device identifier notification message to the first device group according to the multicast MAC address of the first device group, where the device identifier notification message includes the first device identifier.

Optionally, determining that a first station device supports a first service further includes receiving a service announcement message that is sent by the first station device by means of broadcast, where the service announcement message includes identifier information of the first service, and sending a service response message to the first station device, where the service announcement message includes at least one of the multicast MAC address of the first device group, identifier information of the first device group, or the IP address prefix of the first device group.

The station device of this embodiment may be configured to perform a technical solution performed by the second station device in the method embodiment shown in FIG. 3 or any one of FIG. 5 to FIG. 7, an implementation principle and a technical effect of this embodiment are similar to those of the technical solution, and details are not described herein again.

Figure 12:
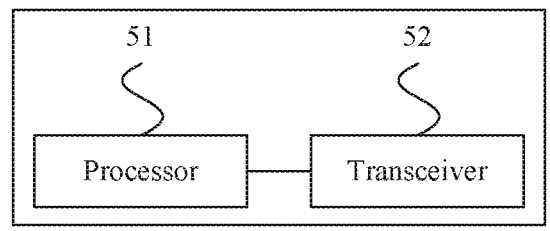
FIG. 12 is a schematic structural diagram of Embodiment 5 of a station device according to the present disclosure.

FIG. 12 is a schematic structural diagram of Embodiment 5 of a station device according to the present disclosure. As shown in FIG. 12, the station device of this embodiment may include a processor 51 and a transceiver 52, where the processor 51 is configured to determine that a second station device supports a first service, and the transceiver 52 is configured to receive a device group join request message that is sent by the second station device according to a multicast MAC address of a first device group. The device group join request message is used to request to join the first device group, the station device in which the transceiver 52 is located, and each station device in the first device group supports the first service, send a device group join response message to another station device in the first device group and the second station device according to the multicast MAC address of the first device group in a contention transmission manner, where the device group join response message is used to allow the second station device to join the first device group, and perform data transmission of the first service with the second station device in a service window of the first service, where the service window includes a time and/or a channel of service transmission.

Optionally, sending a device group join response message to another station device in the first device group and the second station device according to the multicast MAC address of the first device group in a contention transmission manner includes that when a device group join response message sent by the other station device in the first device group is not received in a contention backoff process, sending the device group join response message to the other station device in the first device group and the second station device according to the multicast MAC address of the first device group after the contention backoff process ends. Optionally, if the first station device receives, in the contention backoff process, a device group join response message sent by the other station device in the first device group, the first station device does not send the device group join response message to the other station device in the first device group and the second station device after the contention backoff process ends.

Optionally, after the device group join response message is sent to the other station device in the first device group and the second station device according to the multicast MAC address of the first device group in the contention transmission manner, the transceiver 52 is further configured to receive a device identifier notification message sent by the second station device, where the device identifier notification message includes a first device identifier, and the first device identifier is a device identifier of the second station device in the first device group.

Optionally, the device group join response message includes an IP address prefix of the first device group.

Optionally, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or the IP address prefix of the first device group.

The station device of this embodiment may be configured to perform a technical solution performed by the first station device in the method embodiment shown in FIG. 1 or any one of FIG. 5 to FIG. 7, an implementation principle and a technical effect of this embodiment are similar to those of the technical solution, and details are not described herein again.

Figure 13:
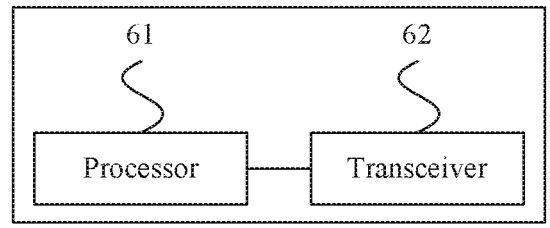
FIG. 13 is a schematic structural diagram of Embodiment 6 of a station device according to the present disclosure.

FIG. 13 is a schematic structural diagram of Embodiment 6 of a station device according to the present disclosure. As shown in FIG. 13, the station device of this embodiment may include a processor 61 and a transceiver 62, where the processor 61 is configured to determine that a first station device supports a first service, where the station device in which the processor 61 is located supports the first service, and the transceiver 62 is configured to send a device group join request message to a first device group according to a multicast MAC address of the first device group. The device group join request message is used to request to join the first device group, the first device group includes the first station device, and each station device in the first device group supports the first service, receive a device group join response message that is sent by a station device in the first device group according to the multicast MAC address of the first device group in a contention transmission manner, where the device group join response message is used to allow the station device in which the transceiver 62 is located to join the first device group, and perform data transmission of the first service with a station device in the first device group in a service window of the first service, where the service window includes a time and/or a channel of service transmission.

Optionally, after the transceiver 62 receives the device group join response message that is sent by the station device in the first device group according to the multicast MAC address of the first device group in the contention transmission manner, the processor 61 is further configured to generate a first device identifier according to a first IP address, where the first IP address is an IP address of the station device in which the processor 61 is located, and the first device identifier is an identifier of the station device in which the processor 61 is located when the station device is in the first device group.

Optionally, before the first device identifier is generated according to the first IP address, the processor 61 is further configured to perform a Hash operation on a MAC address of the station device in which the processor 61 is located to generate a host address of the station device in which the processor 61 is located, and generate the first IP address according to an IP address prefix of the first device group and the host address of the station device in which the processor 61 is located.

Optionally, the device group join response message includes the IP address prefix of the first device group.

Optionally, generating a first device identifier according to a first IP address includes generating the first device identifier according to the host address, in the first IP address, of the station device in which the processor 61 is located, or performing a Hash operation on the first IP address to generate the first device identifier.

Optionally, after the processor 61 generates the first device identifier according to the first IP address, the transceiver 62 is further configured to send a device identifier notification message to the first device group according to the multicast MAC address of the first device group, where the device identifier notification message includes the first device identifier.

Optionally, determining that a first station device supports a first service includes receiving a service announcement message that is sent by the first station device by means of broadcast, where the service announcement message includes identifier information of the first service, and the service announcement message includes information about the service window of the first service, and sending a service response message to the first station device, where the service announcement message includes at least one of the multicast MAC address of the first device group, identifier information of the first device group, or the IP address prefix of the first device group.

The station device of this embodiment may be configured to perform a technical solution performed by the second station device in the method embodiment shown in FIG. 2 or any one of FIG. 5 to FIG. 7, an implementation principle and a technical effect of this embodiment are similar to those of the technical solution, and details are not described herein again.

Figure 14:
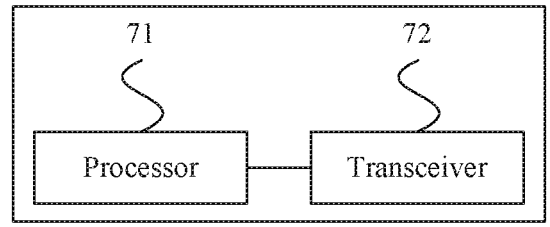
FIG. 14 is a schematic structural diagram of Embodiment 7 of a station device according to the present disclosure.

FIG. 14 is a schematic structural diagram of Embodiment 7 of a station device according to the present disclosure. As shown in FIG. 14, the station device of this embodiment may include a processor 71 and a transceiver 72, where the processor 71 is configured to determine that a second station device supports a first service, and the transceiver 72 is configured to receive a device identifier notification message that is sent by the second station device according to a multicast MAC address of a first device group, where the device identifier notification message includes a first device identifier, the first device identifier is a device identifier of the second station device in the first device group, the first device group includes the station device in which the transceiver 72 is located, and each station device in the first device group supports the first service, and perform data transmission of the first service with the second station device in a service window of the first service, where the service window includes a time and/or a channel of service transmission.

Optionally, determining that a second station device supports a first service includes sending a service announcement message by means of broadcast, where the service announcement message includes identifier information of the first service, and receiving a service response message sent by the second station device, where the service announcement message includes at least one of the multicast MAC address of the first device group, identifier information of the first device group, or the IP address prefix of the first device group.

The station device of this embodiment may be configured to perform a technical solution performed by the first station device in the method embodiment shown in FIG. 4 or any one of FIG. 5 to FIG. 7, an implementation principle and a technical effect of this embodiment are similar to those of the technical solution, and details are not described herein again.

Figure 15:
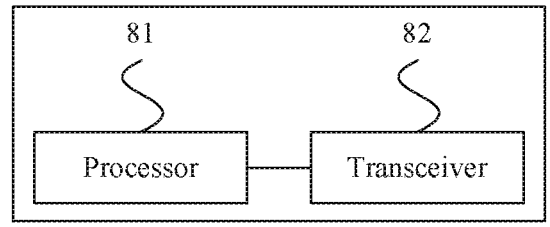
FIG. 15 is a schematic structural diagram of Embodiment 8 of a station device according to the present disclosure.

FIG. 15 is a schematic structural diagram of Embodiment 8 of a station device according to the present disclosure. As shown in FIG. 15, the station device of this embodiment may include a processor 81 and a transceiver 82, where the processor 81 is configured to determine that a first station device supports a first service, where the station device in which the processor 81 is located supports the first service, and generate a first device identifier according to a first IP address, where the first IP address is an IP address of the station device in which the processor 81 is located, the first device identifier is an identifier of the station device in which the processor 81 is located when the station device is in a first device group, the device group join request message is used to request to join the first device group, the first device group includes the first station device, and each station device in the first device group supports the first service, and the transceiver 82 is configured to perform data transmission of the first service with a station device in the first device group in a service window of the first service, where the service window includes a time and/or a channel of service transmission.

Optionally, before the first device identifier is generated according to the first IP address, the processor 81 is further configured to perform a Hash operation on a MAC address of the station device in which the processor 81 is located, to generate a host address of the station device in which the processor 81 is located, and generate the first IP address according to an IP address prefix of the first device group and the host address of the station device in which the processor 81 is located.

Optionally, generating a first device identifier according to a first IP address includes generating the first device identifier according to the host address, in the first IP address, of the station device in which the processor 81 is located, or performing a Hash operation on the first IP address to generate the first device identifier.

Optionally, after the processor 81 generates the first device identifier according to the first IP address, the transceiver 82 is further configured to send a device identifier notification message to the first device group according to the multicast MAC address of the first device group, where the device identifier notification message includes the first device identifier.

Optionally, determining that a first station device supports a first service includes receiving a service announcement message that is sent by the first station device by means of broadcast, where the service announcement message includes identifier information of the first service, and sending a service response message to the first station device, where the service announcement message includes at least one of the multicast MAC address of the first device group, identifier information of the first device group, or the IP address prefix of the first device group.

The station device of this embodiment may be configured to perform a technical solution performed by the second station device in the method embodiment shown in FIG. 3 or any one of FIG. 5 to FIG. 7, an implementation principle and a technical effect of this embodiment are similar to those of the technical solution, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method, comprising:
   determining, by a first station device, that a second station device supports a first service;
   receiving, by the first station device, a device group join request message from the second station device according to a multicast Media Access Control (MAC) address of a first device group, the device group join request message being a request to join the first device group, the first device group comprising the first station device, each station device in the first device group supporting the first service;
   sending, by the first station device, a device group join response message to another station device in the first device group and the second station device according to the multicast MAC address of the first device group after a contention backoff process of the first station device and when the first station device does not receive a second device group join response message from the other station device during the contention backoff process, the device group join response message being a message comprising information to enable the second station device to join the first device group; and
   performing, by the first station device, data transmission of the first service with the second station device in a service window of the first service, and the service window comprises a time or a channel of service transmission.

2. The data transmission method of claim 1, wherein after sending the device group join response message to the other station device in the first device group and the second station device, the method further comprises receiving, by the first station device, a device identifier notification message from the second station device, the device identifier notification message comprising a first device identifier, and the first device identifier is a device identifier of the second station device in the first device group.

3. The data transmission method of claim 1, wherein the device group join response message comprises an Internet Protocol (IP) address prefix of the first device group.

4. The data transmission method of claim 1, wherein determining that the second station device supports the first service comprises:
   sending, by the first station device, a service announcement message by broadcast, the service announcement message comprising identifier information of the first service; and
   receiving, by the first station device, a service response message from the second station device, the service announcement message comprising at least one of the multicast MAC address of the first device group, identifier information of the first device group, or an Internet Protocol (IP) address prefix of the first device group.

5. The data transmission method of claim 1, wherein determining that the second station device supports the first service comprises:
   sending, by the first station device, a service announcement message by broadcast, the service announcement message comprises identifier information of the first service; and
   receiving, by the first station device, a service response message from the second station device, and the service announcement message comprising at least one of the multicast MAC address of the first device group, identifier information of the first device group, or an Internet Protocol (IP) address prefix of the first device group.

6. A station device, comprising:
   a processor configured to determine that a second station device supports a first service; and
   a transceiver coupled to the processor and configured to:
      receive a device group join request message from the second station device according to a multicast Media Access Control (MAC) address of a first device group, the device group join request message being a request to join the first device group, the first device group comprising the station device, each station device in the first device group supporting the first service;
      send a device group join response message to another station device in the first device group and the second station device according to the multicast MAC address of the first device group after a contention backoff process of the station device and when the station device does not receive a second device group join response message from another station device during the contention backoff process, the device group join response message enabling the second station device to join the first device group; and
      perform data transmission of the first service with the second station device in a service window of the first service, and the service window comprises a time or a channel of service transmission.

7. The station device of claim 6, wherein the transceiver is further configured to receive a device identifier notification message from the second station device after the device group join response message is sent to the other station device in the first device group and the second station device, the device identifier notification message comprising a first device identifier, and the first device identifier is a device identifier of the second station device in the first device group.

8. The station device of claim 6, wherein the device group join response message comprises an Internet Protocol (IP) address prefix of the first device group.

9. The station device of claim 6, wherein when determining that the second station device supports the first service, the transceiver is further configured to:
   send a service announcement message by broadcast, the service announcement message comprising identifier information of the first service; and
   receive a service response message from the second station device, and the service announcement message comprising at least one of the multicast MAC address of the first device group, identifier information of the first device group, or an Internet Protocol (IP) address prefix of the first device group.

10. The station device of claim 6, wherein the transceiver is further configured to receive a device identifier notification message from the second station device after the device group join response message is sent to the other station device in the first device group and the second station device, the device identifier notification message comprising a first device identifier, and the first device identifier is a device identifier of the second station device in the first device group.

11. A station device, comprising:
a processor configured to determine that a first station device supports a first service, the station device supporting the first service; and
a transceiver coupled to the processor and configured to:
send a device group join request message to a first device group according to a multicast Media Access Control (MAC) address of the first device group, the device group join request message being a request to join the first device group, the first device group comprising the first station device, each station device in the first device group supporting the first service;
receive a device group join response message from the first station device in the first device group according to the multicast MAC address of the first device group after a contention backoff process of the station device and the station device does not receive a second device group join response message from another station device during the contention backoff process, the device group join response message enabling the station device in which the transceiver is located to join the first device group; and
perform data transmission of the first service with the station device in the first device group in a service window of the first service, and the service window comprising a time or a channel of service transmission.

12. The station device of claim 11, wherein the processor is further configured to generate a first device identifier according to a first Internet Protocol (IP) address after the transceiver receives the device group join response message from the station device in the first device group according to the multicast MAC address of the first device group during the contention backoff process, the first IP address is an IP address of the station device in which the processor is located, and the first device identifier is an identifier of the station device in which the processor is located when the station device is in the first device group.

13. The station device of claim 12, wherein the processor is further configured to:
perform a Hash operation on a MAC address of the station device in which the processor is located to generate a host address of the station device in which the processor is located before the first device identifier is generated according to the first IP address; and
generate the first IP address according to an IP address prefix of the first device group and the host address of the station device in which the processor is located.

14. The station device of claim 13, wherein the device group join response message comprises the IP address prefix of the first device group.

15. The station device of claim 12, wherein when generating the first device identifier, the processor is further configured to:
generate the first device identifier according to a host address, in the first IP address, of the station device in which the processor is located; or
perform a Hash operation on the first IP address to generate the first device identifier.

16. The station device according to claim 12, wherein the transceiver is further configured to send a device identifier notification message to the first device group according to the multicast MAC address of the first device group after the processor generates the first device identifier according to the first IP address, and the device identifier notification message comprising the first device identifier.

17. The station device of claim 12, wherein determining that the first station device supports the first service comprises:
receiving a service announcement message from the first station device by broadcast, the service announcement message comprising identifier information of the first service, and the service announcement message comprising information about the service window of the first service; and
sending a service response message to the first station device, the service announcement message comprises at least one of the multicast MAC address of the first device group, identifier information of the first device group, or an Internet Protocol (IP) address prefix of the first device group.

18. The station device of claim 11, wherein when determining that the first station device supports the first service, the transceiver is further configured to:
receive a service announcement message from the first station device by broadcast, the service announcement message comprising identifier information of the first service, and the service announcement message comprising information about the service window of the first service; and
send a service response message to the first station device, and the service announcement message comprises at least one of the multicast MAC address of the first device group, identifier information of the first device group, or an Internet Protocol (IP) address prefix of the first device group.

* * * * *